(12) United States Patent
Suzuki

(10) Patent No.: US 9,855,870 B2
(45) Date of Patent: Jan. 2, 2018

(54) VEHICLE SEAT LIFTER DEVICE

(71) Applicant: Aisin Seiki Kabushiki Kaisha, Kariya-shi (JP)

(72) Inventor: Yasuaki Suzuki, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/245,596

(22) Filed: Aug. 24, 2016

(65) Prior Publication Data
US 2017/0088018 A1  Mar. 30, 2017

(30) Foreign Application Priority Data
Sep. 30, 2015 (JP) ................... 2015-193336

(51) Int. Cl.
B60N 2/12 (2006.01)
B60N 2/16 (2006.01)
B60N 2/18 (2006.01)

(52) U.S. Cl.
CPC ............. B60N 2/168 (2013.01); B60N 2/165 (2013.01)

(58) Field of Classification Search
CPC ................................. B60N 2/165; B60N 2/168
USPC ........................... 297/344.15, 344.16, 344.17
See application file for complete search history.

(56) References Cited

U.S. PATENT DOCUMENTS

| | | | | |
|---|---|---|---|---|
| 6,464,193 B1 * | 10/2002 | Nemoto | ............... | B60N 2/1615 297/344.15 X |
| 6,666,423 B1 * | 12/2003 | Nemoto | ............... | B60N 2/1615 297/344.15 X |
| 7,338,118 B2 * | 3/2008 | Ichikawa | ............... | B60N 2/071 297/344.15 X |
| 7,938,490 B2 * | 5/2011 | Ishijima | ............... | B60N 2/0296 297/344.15 X |
| 7,959,229 B2 * | 6/2011 | Ishijima | ............... | B60N 2/0296 297/344.15 X |
| 8,132,658 B2 * | 3/2012 | Kawai | ................. | B60N 2/1615 297/344.15 X |
| 8,424,665 B2 * | 4/2013 | Kawai | ................. | B60N 2/1615 297/344.15 X |
| 8,596,721 B2 * | 12/2013 | Ozawa | ................. | B60N 2/1615 297/344.15 X |

(Continued)

FOREIGN PATENT DOCUMENTS

JP  2013-224692  10/2013

*Primary Examiner* — Rodney B White
(74) *Attorney, Agent, or Firm* — Oblon, McClelland, Maier & Neustadt, L.L.P.

(57) ABSTRACT

A vehicle seat lifter device includes: a pinion gear which meshes with an input gear of a link mechanism which causes a seat to undergo lifting and lowering operations; and a rotational control device which controls rotation of the pinion gear. The rotational control device includes a rotating shaft which rotates in synchronization with the pinion gear, a rotation restriction mechanism including a first meshing member which rotates with the rotating shaft and a second meshing member which restricts rotation of the rotating shaft by meshing with the first meshing member, an input member which is linked to an operation handle to rotate around the rotating shaft, a release mechanism which releases the meshing of the first and second meshing members through rotation of the input member from a neutral position, and a braking mechanism which applies a braking force to the rotating shaft.

4 Claims, 16 Drawing Sheets

(56) References Cited

U.S. PATENT DOCUMENTS

| | | | | |
|---|---|---|---|---|
| 8,616,636 B2* | 12/2013 | Arata | B60N 2/1615 | 297/344.15 X |
| 2008/0007104 A1* | 1/2008 | Yokota | B60N 2/1615 | 297/344.15 |
| 2010/0001569 A1* | 1/2010 | Shinozaki | B60N 2/1615 | 297/344.15 |
| 2012/0074743 A1* | 3/2012 | Asakura | B60N 2/1615 | 297/216.1 |
| 2015/0096859 A1* | 4/2015 | Isoda | F16D 41/18 | 192/15 |
| 2015/0151653 A1* | 6/2015 | Furuta | B60N 2/68 | 297/344.15 |
| 2015/0210188 A1* | 7/2015 | Hoshi | B60N 2/68 | 297/344.12 |
| 2015/0231993 A1* | 8/2015 | Hoshi | B60N 2/1615 | 297/344.12 |
| 2015/0231994 A1* | 8/2015 | Benjamin | B60N 2/165 | 297/344.15 |
| 2015/0239369 A1* | 8/2015 | Hoshi | B60N 2/68 | 297/362.12 |
| 2015/0266397 A1* | 9/2015 | Benjamin | B60N 2/168 | 192/15 |
| 2015/0306983 A1* | 10/2015 | Takei | B60N 2/6009 | 297/183.9 |
| 2015/0314708 A1* | 11/2015 | Kim | B60N 2/165 | 297/344.12 |
| 2015/0314709 A1* | 11/2015 | Kim | B60N 2/165 | 297/344.12 |
| 2015/0321589 A1* | 11/2015 | Takei | B60N 2/6009 | 297/452.18 |
| 2015/0336477 A1* | 11/2015 | Matsui | B60N 2/682 | 297/344.15 |
| 2016/0114703 A1* | 4/2016 | Fujita | B60N 2/0232 | 297/344.1 |
| 2016/0176325 A1* | 6/2016 | Fujita | B60N 2/1615 | 297/344.13 X |
| 2016/0280099 A1* | 9/2016 | Kaku | F16D 51/36 | |

* cited by examiner

VEHICLE SEAT LIFTER DEVICE

CROSS REFERENCE TO RELATED APPLICATIONS

This application is based on and claims priority under 35 U.S.C. §119 to Japanese Patent Application 2015-193336, filed on Sep. 30, 2015, the entire contents of which are incorporated herein by reference.

TECHNICAL FIELD

This disclosure relates to a vehicle seat lifter device.

BACKGROUND DISCUSSION

A seat lifter device which is used in vertical position adjustment of a vehicle seat is generally provided with a link mechanism which causes a seat to undergo lifting and lowering operations, a pinion gear which meshes with an input gear provided in the link mechanism, and a rotational control device which controls the rotation of the pinion gear. In a case in which the seat lifter device is a manual system seat lifter device, a configuration is adopted in which the vertical position of the seat which is supported by the link mechanism is adjusted by transmitting a drive force which is input to the operation handle to the pinion gear via the rotational control device.

For example, the rotational control device (a clutch unit) of the seat lifter device which is disclosed in JP-A-2013-224692 (Reference 1) is capable of moving the seat in the vertical direction through a pulling up operation or a pushing down operation of the operation handle which is linked to the rotational control device. The rotational control device includes a first meshing member which rotates integrally with the rotating shaft of the pinion gear, and a second meshing member which meshes with the first meshing member. By forming a so-called stepped lock system rotation restriction mechanism which restricts the rotation of the pinion gear through the meshing of the first and the second meshing members, it becomes possible to stably hold the vertical position (a lifting position) of the seat in a state in which the operation handle is not being operated.

A rotational control device of the related art includes a sliding contact member which applies frictional resistance to the rotating shaft through sliding contact with the rotating shaft of the pinion gear. Accordingly, the seat is configured so as to not suddenly move downward due to the seat load, even in a state in which the rotational restriction of the rotation restriction mechanism is released during the operation of the operation handle.

However, in the configuration of the related art, in a case in which the braking force (the holding force) based on the friction resistance is excessive, after operating the operation handle, the rotating shaft of the pinion gear may not be capable of rotating to a position at which the first and second meshing members which form the rotation restriction mechanism correctly mesh. In this case, subsequently, due to vibration and the like, a passenger sitting on the seat may feel uneasy in relation to vibrations and sounds which are generated when the meshing position is shifted.

Meanwhile, in a case in which the braking force which is applied to the rotating shaft is set low in order to avoid shifting the meshing position, when releasing the meshing between the first and second meshing members, the release operation of the meshing members is performed in a state in which a great load is applied to the meshing members. Since an increase in the operation force and generation of a release sound which are associated with performing the release operation of the meshing members in a state in which a great load is applied to the meshing members may become factors in reducing the operational comfort, from this perspective, there is room for further improvement.

SUMMARY

Thus, a need exists for a vehicle seat lifter device which is not suspectable to the drawback mentioned above.

It is preferable that a vehicle seat lifter device according to an aspect of this disclosure includes a pinion gear which meshes with an input gear of a link mechanism which causes a seat to undergo lifting and lowering operations, and a rotational control device which controls rotation of the pinion gear, in which the rotational control device includes a rotating shaft which rotates in synchronization with the pinion gear, a rotation restriction mechanism including a first meshing member which rotates with the rotating shaft and a second meshing member which restricts rotation of the rotating shaft by meshing with the first meshing member, an input member which is linked to an operation handle to rotate around the rotating shaft, a release mechanism which releases the meshing of the first and second meshing members through rotation of the input member from a neutral position, and a braking mechanism which applies a braking force to the rotating shaft, in which the braking mechanism is provided with a spring member in which a spring main body is fitted to the rotating shaft in a state of being in contact with an outer circumference of the rotating shaft based on an elastic force, and first and second spring end portions are disposed on an outside in a radial direction of the rotating shaft, where relative positions of the first and second spring end portions change and the spring main body warps in a diameter expanding direction due to the spring member rotating in a rotational direction of the rotating shaft, and in which the braking mechanism is configured such that, when the meshing of the first and second meshing members is released based on an operation of the release mechanism, relative positional variation of the first and second spring end portions which causes the spring main body to warp in the diameter expanding direction is restricted.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, description will be given of an embodiment relating to a vehicle seat lifter device according to the drawings.

Figure 1:
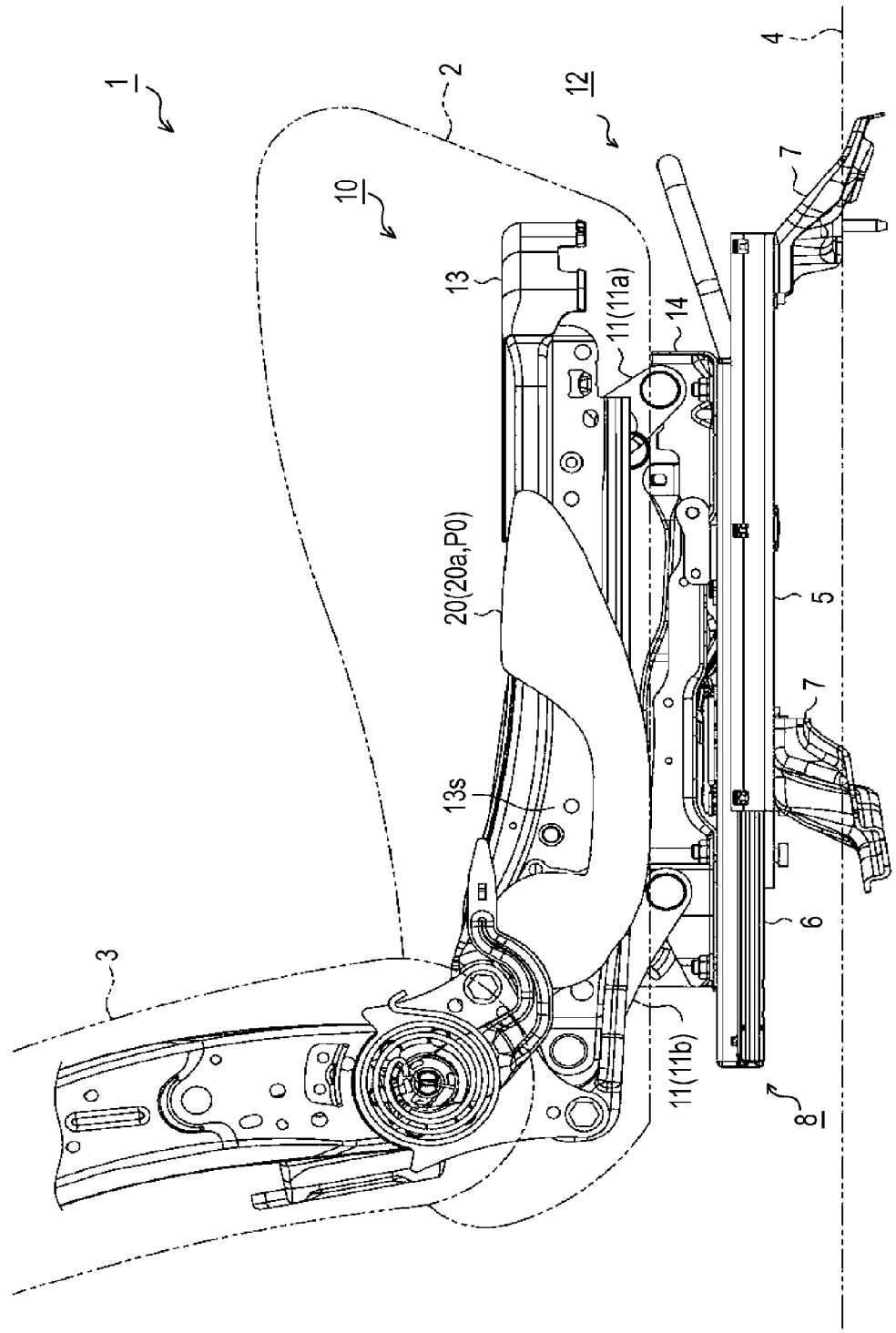
FIG. 1 is a side surface diagram of a seat lifter device (viewed from outside in a vehicle width direction)

As illustrated in FIG. 1, a seat 1 for a vehicle is provided with a seat cushion 2, and a seat back 3 which is provided to tilt freely in relation to a rear end portion of the seat cushion 2. In the present embodiment, a left-right pair of lower rails 5 is provided on a floor portion 4 of the vehicle, each lower rail 5 extending in the vehicle front-rear direction. An upper rail 6 capable of relative movement over the corresponding lower rail 5 in the extending direction of the lower rail 5 is mounted onto each of the lower rails 5. The lower rail 5 of the present embodiment is supported on a bracket 7 which is provided on the floor portion 4. The seat 1 of the present embodiment is supported on a seat slide device 8 which is formed by the lower rails 5 and the upper rails 6.

The seat 1 of the present embodiment is fixed to the upper rails 6 via a seat lifter device 10. The passenger of the vehicle is capable of performing positional adjustment of the seat 1 in the vertical direction (height adjustment of the seat cushion 2) by using the function of the seat lifter device 10.

Figure 2:
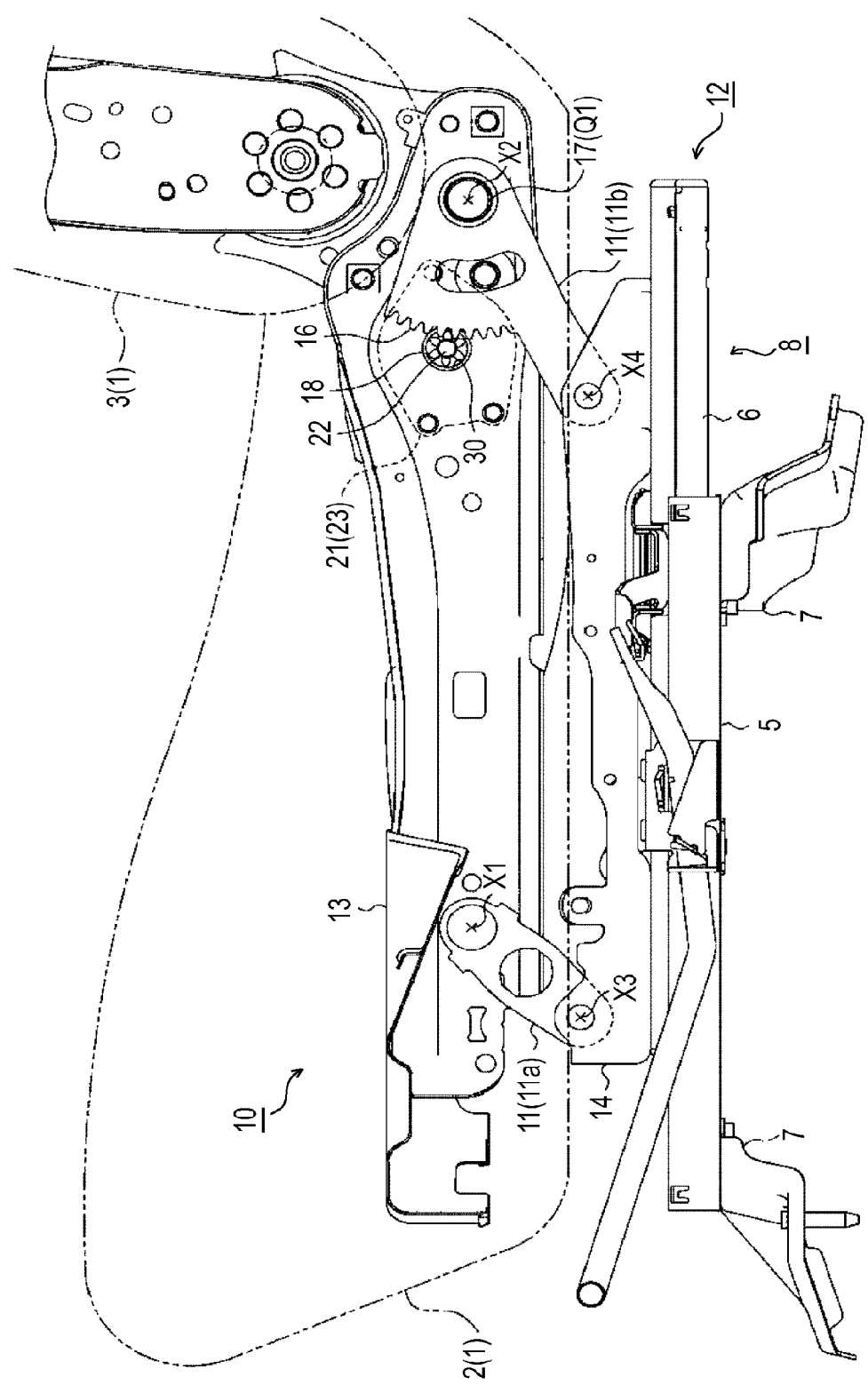
FIG. 2 is a side surface diagram of the seat lifter device (viewed from inside in the vehicle width direction)

In detail, as illustrated in FIG. 2, the seat lifter device 10 of the present embodiment is provided with a link mechanism 12 which supports the seat 1 via a plurality of link members 11 which are provided to rotate freely. Specifically, the link mechanism 12 is provided with a front link 11a which is linked to a front end portion (the end portion of the left side in FIG. 2) of a side frame 13 which forms the framework of the seat cushion 2, and the front end portion of a base member 14 which is provided on the upper rail 6. The front link 11a is linked to be capable of rotating. The link mechanism 12 is provided with a rear link 11b which is linked to the rear end portion (the end portion of the right side in FIG. 2) of the side frame 13, and the rear end portion of the base member 14. The rear link 11b is linked to be capable of rotating. In other words, a well-known parallel link mechanism is used for the link mechanism 12 of the present embodiment. Through the rotation of the link members 11 which form the link mechanism 12, the seat lifter device 10 of the present embodiment is capable of causing the seat 1 which is supported on the seat lifter device 10 to undergo lifting and lowering operations.

In the present embodiment, joining points X1 and X2 of the front link 11a and the rear link 11b which are joined to the side frame 13 are disposed closer to the rear side (the right side in FIG. 2) of the vehicle than joining points X3 and X4 of the front link 11a and the rear link 11b which are joined to the base member 14. In other words, in the link mechanism 12 of the present embodiment, the seat 1 which is supported on the link members 11 moves upward through the link members 11 rotating in a direction in which the joining points X1 and X2 of the side frame 13 side move to the front (the left side in FIG. 2) of the vehicle (counterclockwise rotation in FIG. 2). The seat 1 which is supported on the link members 11 is configured to move downward through the link members 11 rotating in a direction in which the joining points X1 and X2 move to the rear side of the vehicle (clockwise rotation in FIG. 2).

In the present embodiment, an input gear 16 (a sector gear) is formed on the rear link 11b which is joined to the side frame 13 of the right side. The rear link 11b is one of the link members 11 which form the link mechanism 12, and the rotational center of the input gear 16 is the joining point X2. In other words, the input gear 16 shares a rotating shaft Q1 with the rear link 11b and rotates integrally. In the present embodiment, a torque rod 17 which joins (rear end portions 13b of) the side frames 13 of the left and right sides forms the rotating shaft Q1 of the rear link 11b. Through the driving of the rear link 11b via the input gear 16, the link mechanism 12 of the present embodiment is capable of causing the seat 1 which is supported on the link mechanism 12 to undergo lifting and lowering operations.

Figure 3:
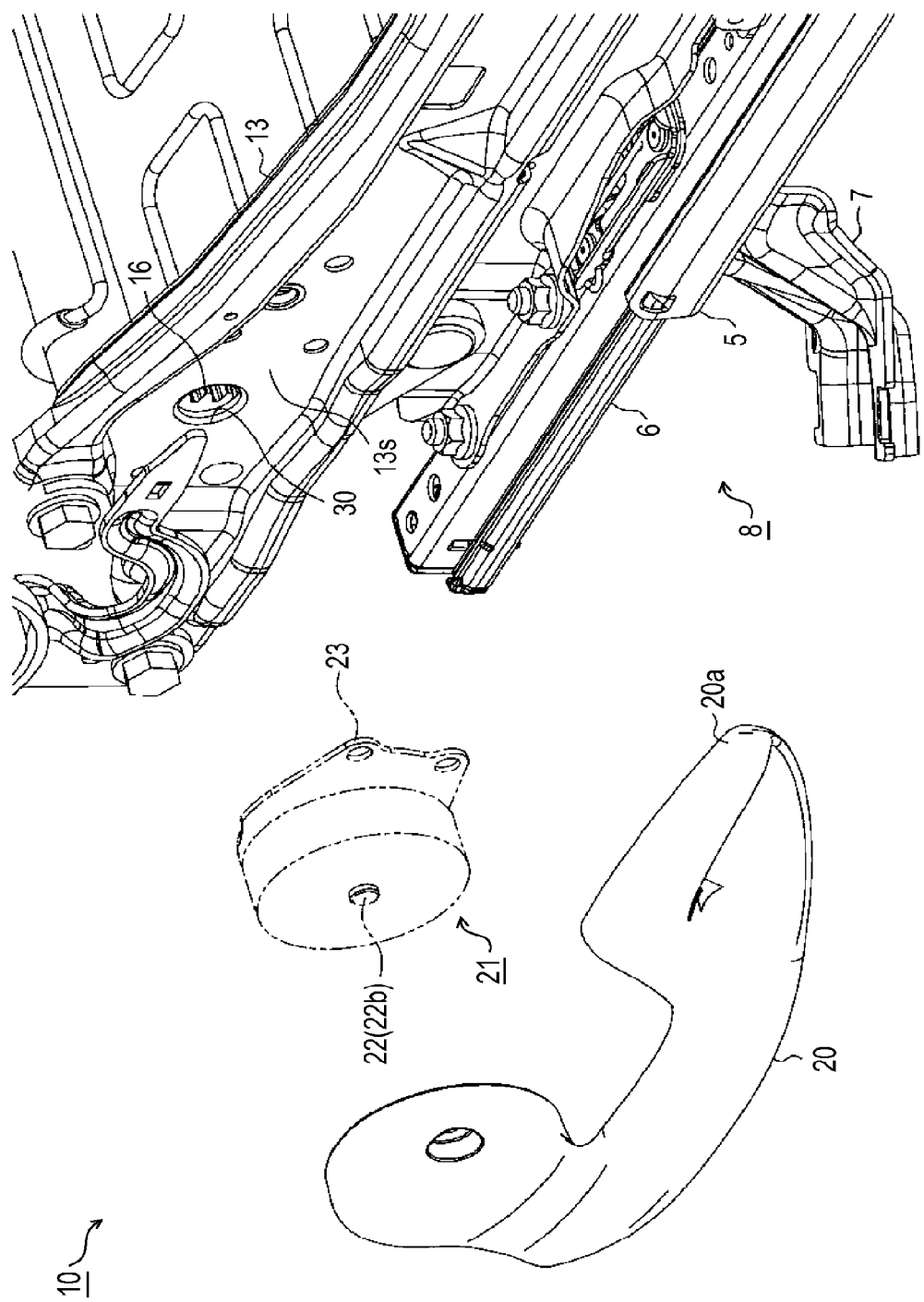
FIG. 3 is a perspective view of a rotational control device which forms an operation handle and a seat lifter device.

Furthermore, the seat lifter device 10 of the present embodiment is provided with a pinion gear 18 which meshes with the input gear 16 of the link mechanism 12 which is configured as described above. As illustrated in FIGS. 1 and 3, in the present embodiment, an operation handle 20 is provided on the side of the seat cushion 2 (the front side of the paper in FIG. 1). As illustrated in FIGS. 2 and 3, the seat lifter device 10 of the present embodiment is provided with a rotational control device 21 which controls the rotation of the pinion gear 18 based on operational input to the operation handle 20.

Figure 4:
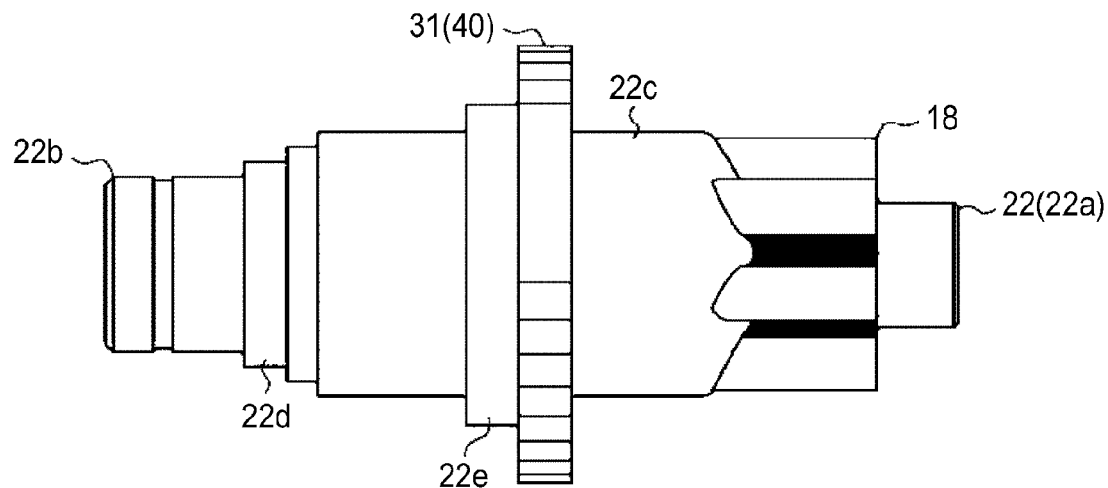
FIG. 4 is a side surface diagram of a pinion gear and a ratchet which are formed integrally with a rotating shaft.
Figure 5:
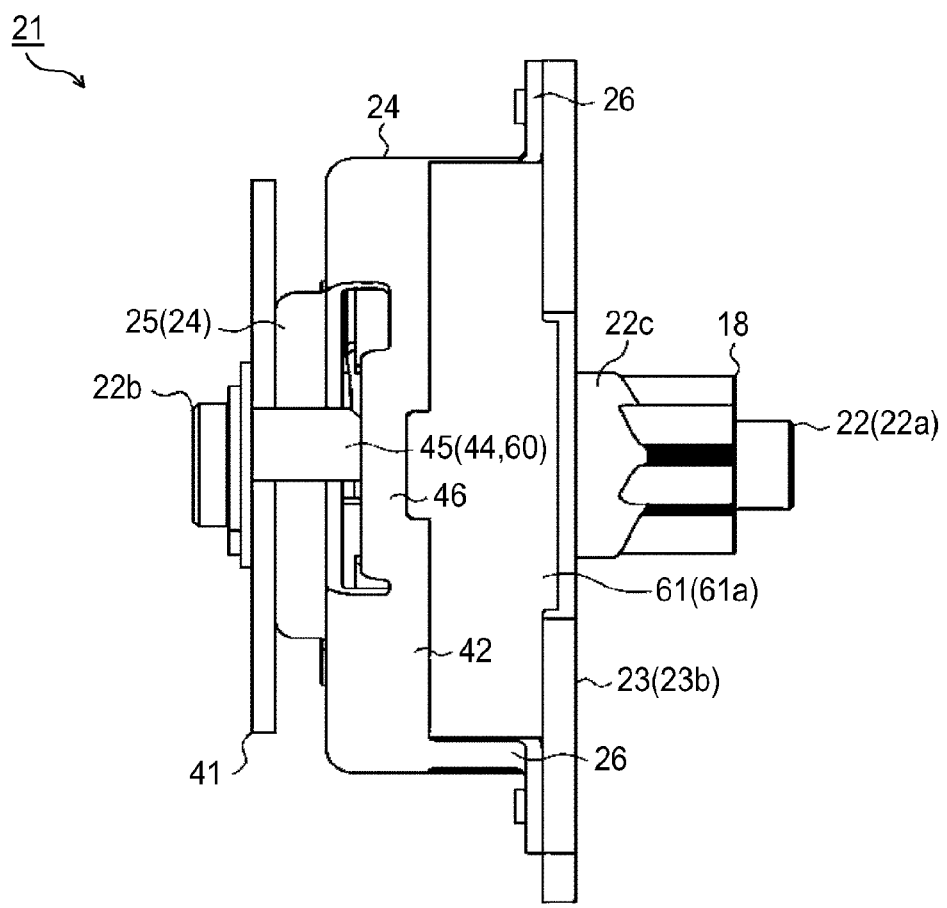
FIG. 5 is a side surface diagram of the rotational control device.

Specifically, as illustrated in FIG. 4, in the seat lifter device 10 of the present embodiment, the pinion gear 18 is formed integrally with a rotating shaft 22. As illustrated in FIGS. 5 to 11, the rotational control device 21 of the present embodiment is provided with a first support member 23 and a second support member 24 which support the rotating shaft 22 of the pinion gear 18 in a free rotating manner.

Figure 8:
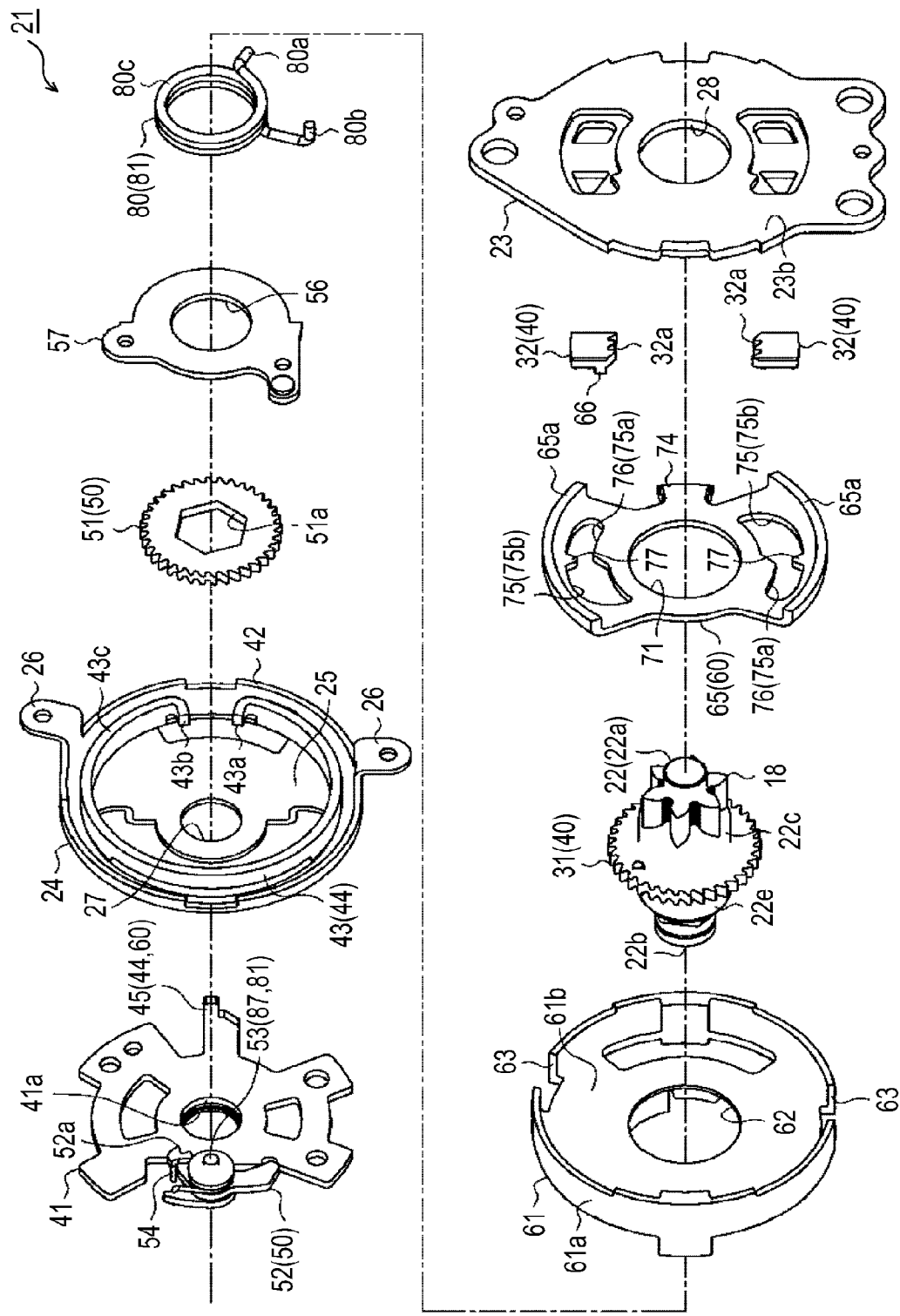
FIG. 8 is an exploded perspective view of the rotational control device.
Figure 9:
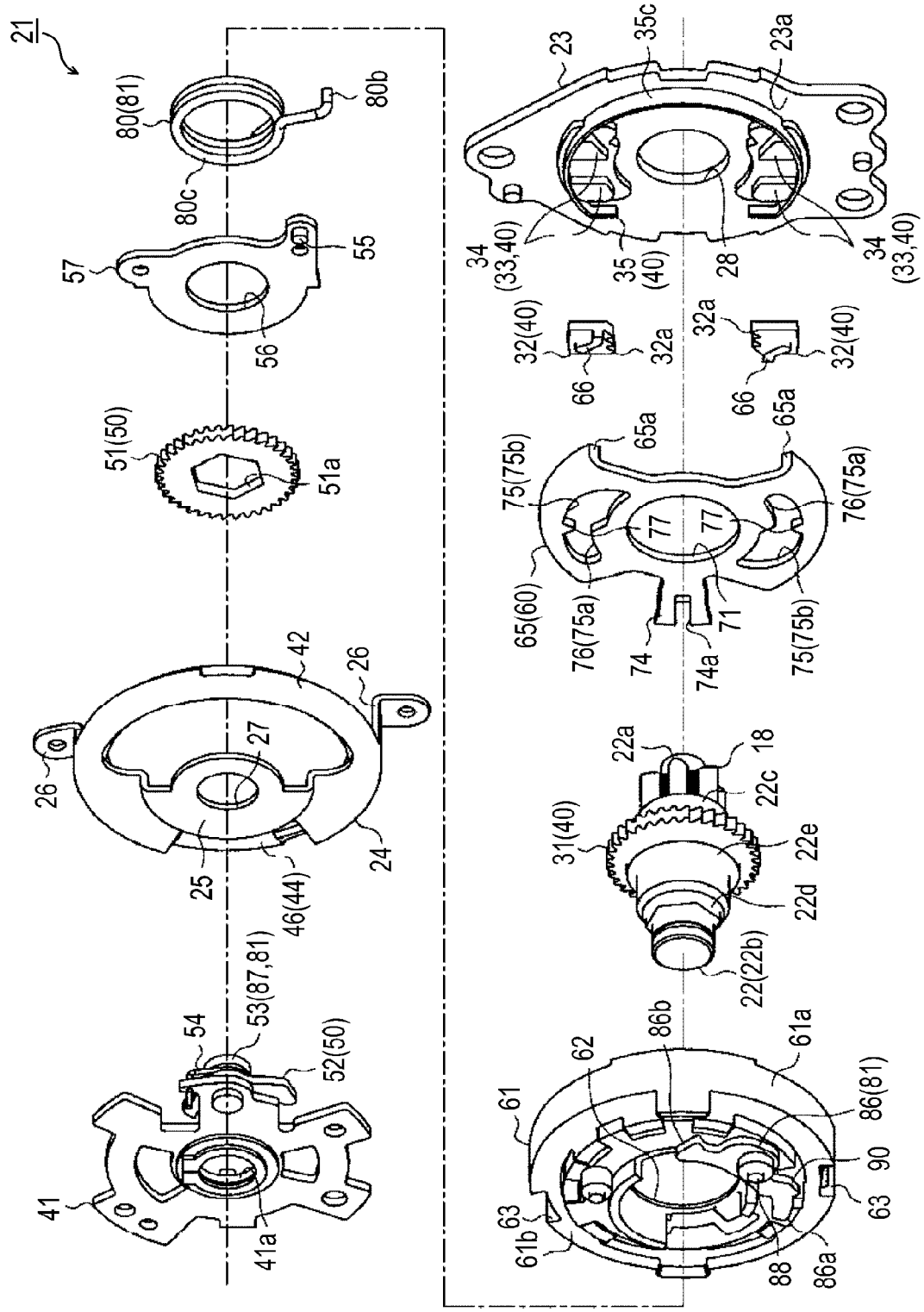
FIG. 9 is an exploded perspective view of the rotational control device.
Figure 10:
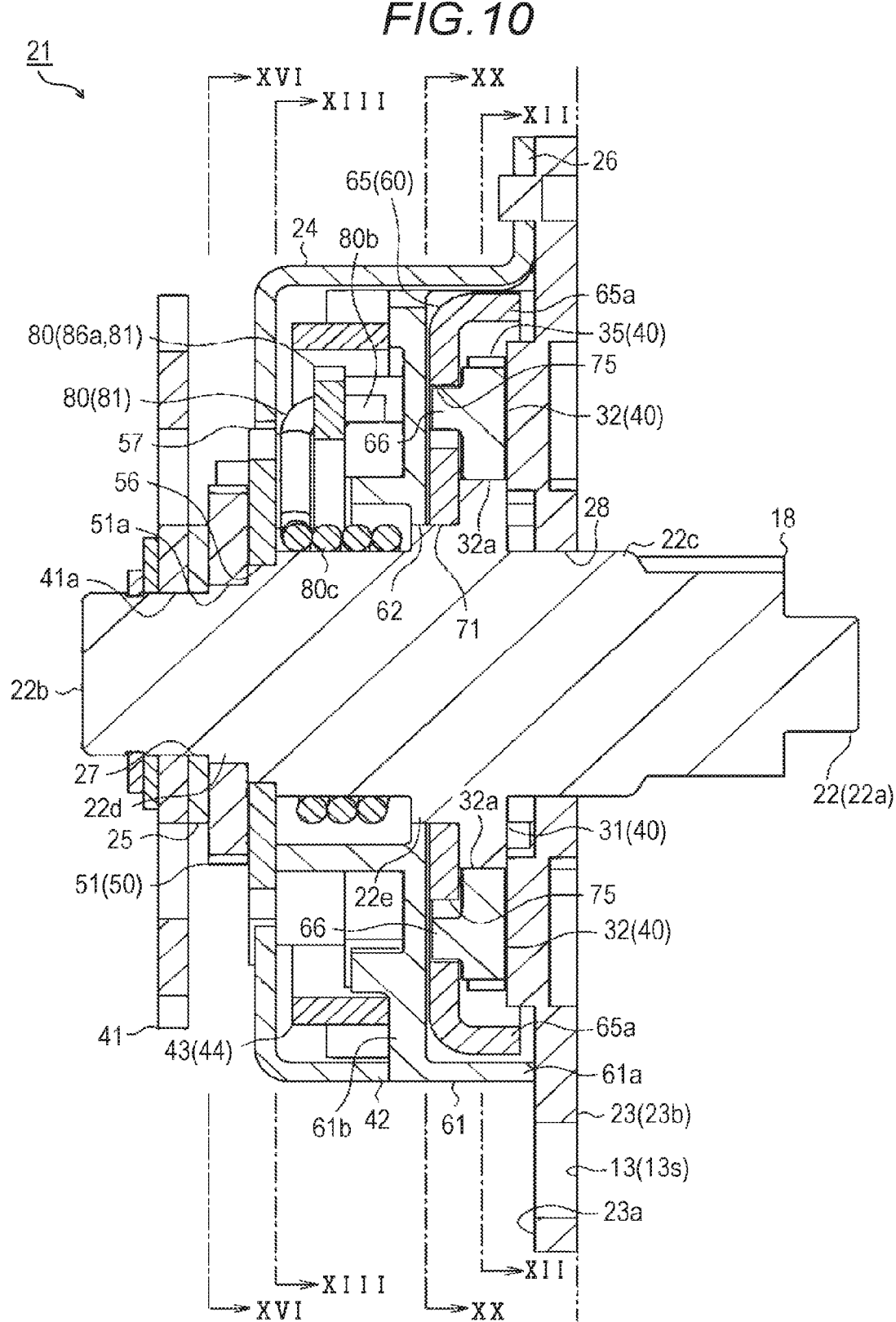
FIG. 10 is a sectional diagram of the rotational control device (an X-X cross-section in FIG. 6)

As illustrated in FIGS. 8 to 10, the first support member 23 has a substantially plate-shaped exterior. The second support member 24 is provided with a plate portion 25 which faces the first support member 23. The second support member 24 of the present embodiment includes a plurality of (in the present embodiment, two) leg portions 26, the leg portions 26 are fixed to the first support member 23, and thus, the plate portion 25 is disposed to face the first support member 23. Insertion holes 27 and 28 through which the rotating shaft 22 of the pinion gear 18 is inserted are formed in the plate portion 25 of the second support member 24 and the first support member 23, respectively.

Specifically, as illustrated in FIG. 4, the pinion gear 18 of the present embodiment is formed on one end side of the rotating shaft 22 (a first end portion 22a, the end portion of the right side in FIG. 4). A large diameter portion 22c which continues from the pinion gear 18 and extends to the center side in an axial line direction (the left side in FIG. 4) is provided on the rotating shaft 22.

Meanwhile, as illustrated in FIG. 10, the inner diameter of the insertion hole 28 which is formed in the first support member 23 is set to be approximately equal (slightly larger than) the outer diameter of the large diameter portion 22c which is provided on the rotating shaft 22 of the pinion gear 18. The inner diameter of the insertion hole 27 which is formed in the plate portion 25 of the second support member 24 is set to be approximately equal to (slightly larger than) the outer diameter of the other end side (a second end portion 22b, the end portion of the left side in FIG. 10) of the rotating shaft 22 which is positioned on the opposite side of the pinion gear 18. In other words, in the rotational control device 21 of the present embodiment, the large diameter portion 22c of the rotating shaft 22 of the pinion gear 18 is held by the first support member 23, and the second end portion 22b of the rotating shaft 22 is held by the plate portion 25 of the second support member 24. Accordingly, the rotational control device 21 of the present embodiment is configured to support the rotating shaft 22 of the pinion gear 18 to rotate freely in a state in which the pinion gear 18 protrudes from a reverse surface 23b side (the right side in FIG. 10) of the first support member 23 of the rotational control device 21.

As illustrated in FIGS. 3 and 10, the rotational control device 21 of the present embodiment is fixed to a side surface 13s of the side frame 13 which forms the framework of the seat cushion 2, using the reverse surface 23b of the first support member 23 of the rotational control device 21 as a fixing surface. Specifically, as illustrated in FIGS. 2 and 3, in the seat 1 of the present embodiment, a though hole 30 which penetrates the side frame 13 in the seat width direction (a direction perpendicular to the paper surface in FIG. 2) is formed in the side surface 13s of the side frame 13. The input gear 16 of the link mechanism 12 side is provided in a position facing the though hole 30. The rotational control device 21 of the present embodiment is configured to be fixed to the side frame 13 of the seat 1 in a mode in which the pinion gear 18 which protrudes from the reverse surface 23b of the first support member 23 is inserted into the though hole 30.

Figure 12:
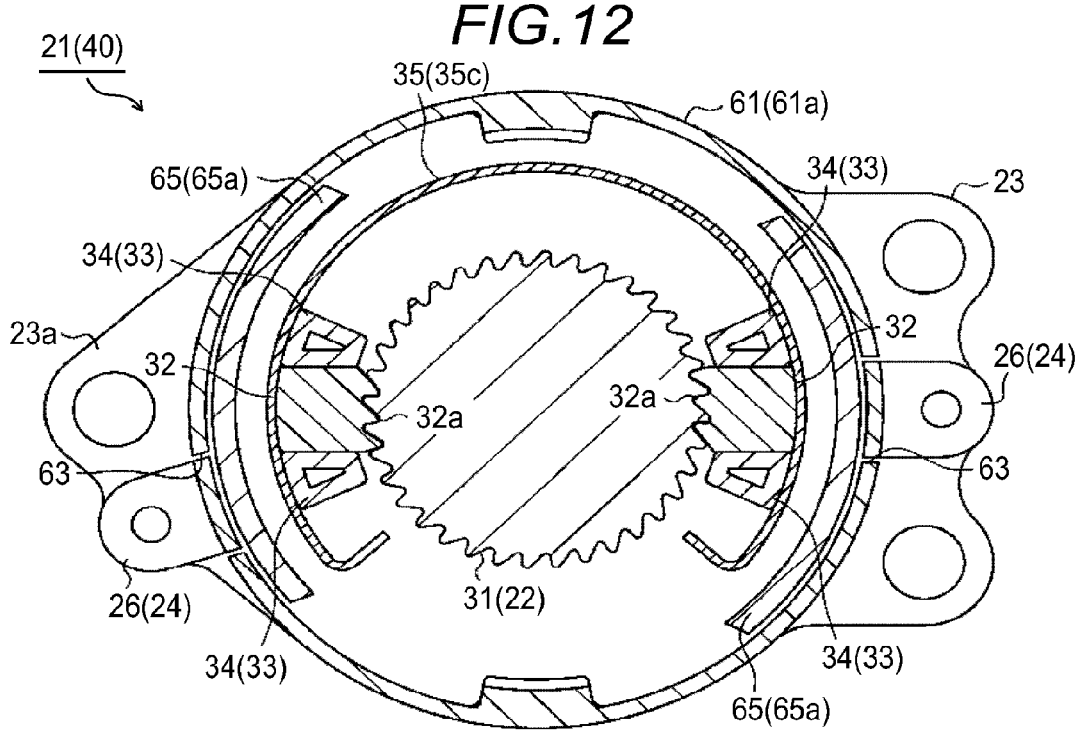
FIG. 12 is a sectional diagram of the rotational control device (an XII-XII cross-section in FIG. 10)

As illustrated in FIGS. 4, 8, and 9, a ratchet 31 which serves as the first meshing member which rotates together with the rotating shaft 22 is provided on the rotating shaft 22 of the pinion gear 18 in the rotational control device 21 of the present embodiment. In the present embodiment, the ratchet 31 is provided approximately on a center portion of the rotating shaft 22. As illustrated in FIGS. 8, 9, and 12, the rotational control device 21 of the present embodiment is provided with a plurality of lock members 32 which restrict the rotation of the rotating shaft 22 which is provided with the ratchet 31 and the pinion gear 18. The rotation of the rotating shaft 22 is restricted through the engaging of the lock members 32 with the ratchet 31.

In detail, as illustrated in FIG. 12, in the rotational control device 21 of the present embodiment, the lock members 32 are disposed on the outside in the radial direction of the ratchet 31 in a state in which the lock members 32 may not move in the circumferential direction due to being held by a lock holding portion 33 which is provided on the first support member 23. The rotational control device 21 of the present embodiment is provided with a pair of the lock members 32 which are disposed in positions separated by approximately 180° in the circumferential direction to interpose the ratchet 31. The lock member 32 of the present embodiment has a substantially plate-shaped exterior which includes a meshing portion 32a on one end which meshes with the ratchet 31. A plurality of holding protruding portions 34 which form the lock holding portion 33 of the lock members 32 are formed on a surface 23a of the first support member 23.

Specifically, in the rotational control device 21 of the present embodiment, each of the lock holding portions 33 is formed of a pair of the holding protruding portions 34 which are lined up in the circumferential direction of the ratchet 31 at a predetermined interval. Each of the lock members 32 is configured to be interposed between two of the holding protruding portions 34 which form the lock holding portion 33, and thus, the circumferential direction movement around the ratchet 31 is restricted.

The lock holding portion 33 of the present embodiment allows movement in the radial direction of the lock member 32 which is held by the lock holding portion 33, that is, allows relative movement in a direction in which the meshing portion 32a of the lock member 32 approaches and separates from the ratchet 31. Furthermore, the rotational control device 21 of the present embodiment is provided with a ring spring 35 which serves as a biasing member which biases the lock members 32 to push the lock members 32 into the ratchet 31. In other words, the ring spring 35 includes a spring main body 35c which is curved in a substantially arc shape (is substantially C-shaped). The lock members 32 are configured such that the meshing portions 32a mesh with the ratchet 31 through the relative movement of the lock members 32 to the inside in the radial direction based on the elastic force (an elastic restorative force) in a direction in which the diameter of the ring spring 35 is reduced.

Here, in the present embodiment, the ratchet 31 and the lock members 32 are configured such that, based on the meshing part shape (the tooth shape), in a case in which the ratchet 31 rotates in a counter-clockwise direction in FIG. 12, a force of the lock members 32 which mesh with the ratchet 31 moving to the outside in the radial direction, that is, a force causing the lock members 32 to detach from the ratchet 31 is generated. Accordingly, the rotational control device 21 of the present embodiment is configured to form a ratchet mechanism 40 which serves as the rotation restriction mechanism which restricts the rotation of the rotating shaft 22 in the direction in which the seat 1 moves downward while allowing the rotation of the rotating shaft 22 in the direction in which the seat 1 moves upward.

In other words, the seat lifter device 10 of the present embodiment is configured such that, due to the rotating shaft 22 of the pinion gear 18 rotating integrally with the ratchet 31 in the first direction (the counter-clockwise direction in FIG. 12), the seat 1 which is supported by the link mechanism 12 moves upward. At this time, in the ratchet mechanism 40, the lock members 32 which mesh with the ratchet 31 move to the outside in the radial direction against the biasing force of the ring spring 35 based on the shapes of the meshing parts of the ratchet 31 and the lock members 32. Accordingly, the ratchet mechanism 40 of the present embodiment is configured to allow the rotation of the rotating shaft 22 in the first direction in which the seat 1 which is supported on the link mechanism 12 moves upward in a mode in which the lock members 32 which mesh with the ratchet 31 pass over the tooth portions of the ratchet 31, one tooth at a time.

Furthermore, the ratchet mechanism 40 of the present embodiment is configured such that, in a case in which the ratchet 31 rotates in the second direction (the clockwise direction in FIG. 12), the meshing between the ratchet 31 and the lock members 32 is strengthened (bites in) based on the shapes of the meshing parts of the ratchet 31 and the lock members 32. Accordingly, the rotational control device 21 of the present embodiment is capable of holding the seat position against the seat load by restricting the rotation of the rotating shaft 22 in the direction in which the seat 1 which is supported on the link mechanism 12 moves downward.

As illustrated in FIGS. 6 to 11, the rotational control device 21 of the present embodiment is provided with a substantially plate-shaped input member 41 which rotates around the rotating shaft 22 of the pinion gear 18 in accordance with the input of an operation to the operation handle 20. As illustrated in FIGS. 8 to 10, the input member 41 of the present embodiment includes an insertion hole 41a through which (the second end portion 22b of) the rotating shaft 22 of the pinion gear 18 is inserted. The seat lifter device 10 of the present embodiment is configured such that the operation handle 20 is directly fixed to the input member 41. Accordingly, the input member 41 of the present embodiment is configured to rotate integrally with the operation handle 20 at a position which is coaxial with the pinion gear 18.

As illustrated in FIGS. 1 and 3, the operation handle 20 of the present embodiment has a lever shape which extends to the front side of the vehicle (the right side in FIG. 1), using the tip portion as a handle portion 20a. The handle portion 20a is disposed on the side of the seat cushion 2 using a position at which the handle portion 20a is substantially parallel to the floor portion of the vehicle as a neutral position P0.

In the seat lifter device 10 of the present embodiment, the operation handle 20 is rotationally operated in a direction in which the handle portion 20a is pulled up, and in a direction in which the handle portion 20a is pushed down. The input member 41 of the present embodiment is configured to rotate in the first direction (the counter-clockwise direction in FIG. 6) through a pulling up operation of the operation handle 20, and to rotate in the second direction (the clockwise direction in FIG. 6) through a pushing down operation.

Figure 13:
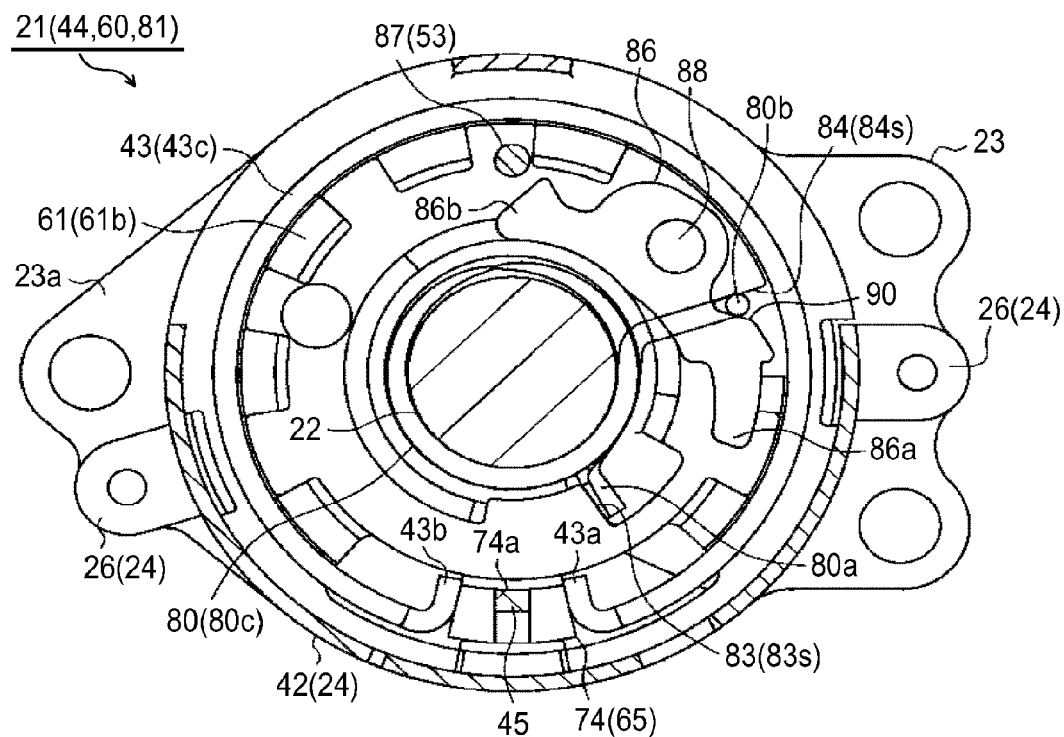
FIG. 13 is a sectional diagram of the rotational control device (a neutral position of an XIII-XIII cross-section in FIG. 10)

Here, as illustrated in FIGS. 8 to 10, in the rotational control device 21 of the present embodiment, the second support member 24 includes a flat cylindrical portion 42 which is substantially cylindrical and is disposed in a position between the plate portion 25 and the leg portions 26 in a mode of surrounding the rotating shaft 22 on the outside thereof in the radial direction. As illustrated in FIGS. 8 and 13, in the same manner as the ring spring 35 (refer to FIG. 12) which forms the biasing member of the ratchet mechanism 40, a ring spring 43 including a spring main body 43c which is curved in a substantially arc shape (is substantially C-shaped) is provided on the inside of the cylindrical portion 42. As illustrated in FIGS. 11 and 13 to 15, the rotational control device 21 of the present embodiment is provided with a handle return mechanism 44 which causes the operation handle 20 which is joined to the input member 41 to return to the neutral position P0 based on the elastic force (the elastic restorative force) of the ring spring 43.

Figure 7:
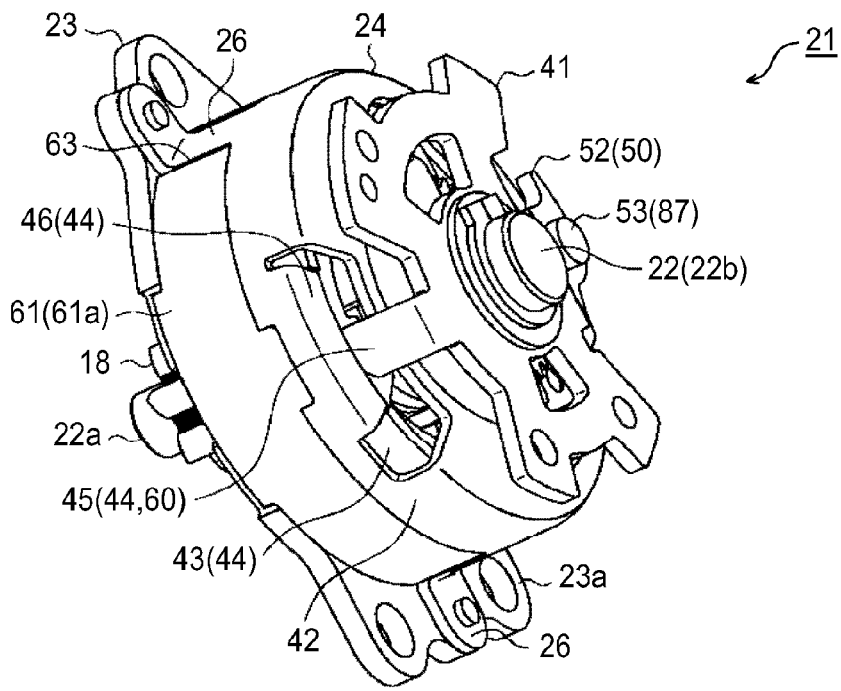
FIG. 7 is a perspective view of the rotational control device.
Figure 11:
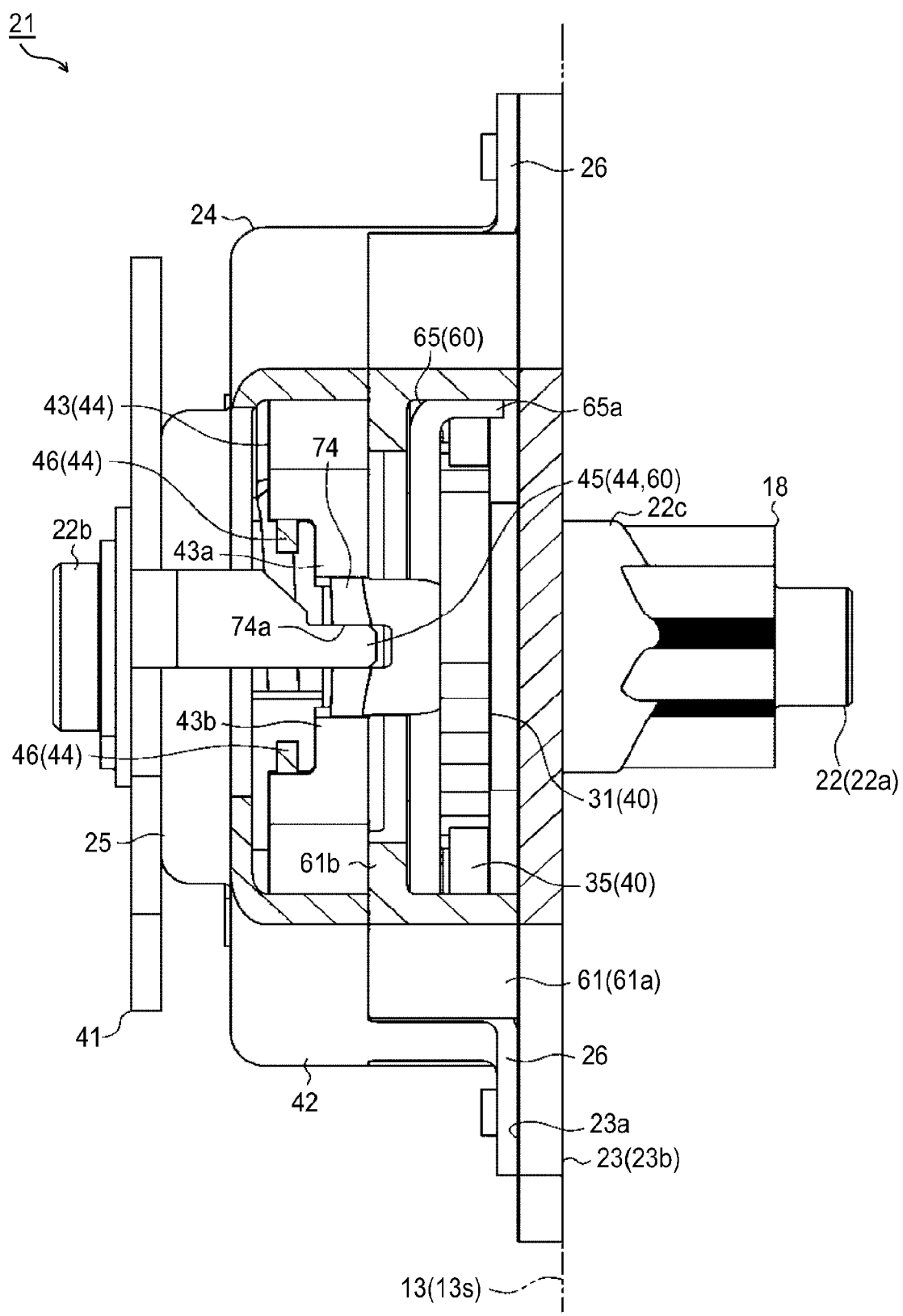
FIG. 11 is a sectional diagram of the rotational control device (an XI-XI cross-section in FIG. 6)

In detail, as illustrated in FIGS. 7, 8, and 11, a connecting part 45 is provided on the input member 41 of the present embodiment to extend from a circumferential edge portion of the input member 41 toward the first support member 23 side (the right side in FIG. 11) along the axial line direction of the rotating shaft 22. As illustrated in FIG. 13, the ring spring 43 of the present embodiment includes folded portions 43a and 43b which are folded from both end portions of the spring main body 43c to the inside in the radial direction. As illustrated in FIGS. 11 and 13, the tip of the connecting part 45 which is provided on the input member 41 is disposed between both of the folded portions 43a and 43b.

In other words, the rotational control device 21 of the present embodiment is configured such that, through the rotation of the input member 41 based on operational input to the operation handle 20, the connecting part 45 of the input member 41 presses either one of the folded portions 43a and 43b which are provided on both ends of the ring spring 43 in the circumferential direction. In the present embodiment, the tip of the connecting part 45 is configured to fit a connecting part 74 of a release member 65 (described later), and the folded portions 43a and 43b of the ring spring 43 are pressed against the connecting part 45 of the input member 41 via the connecting part 74 of the release member 65. The handle return mechanism 44 of the present embodiment is configured to return the connecting part 45 of the input member 41 to the position in the circumferential direction from before the rotation, that is, to the position in the circumferential direction corresponding to the neutral position P0 of the operation handle 20 based on the elastic force of the ring spring 43 which is generated by the folded portions 43a and 43b being pressed against the connecting part 45 of the input member 41.

Figure 14:
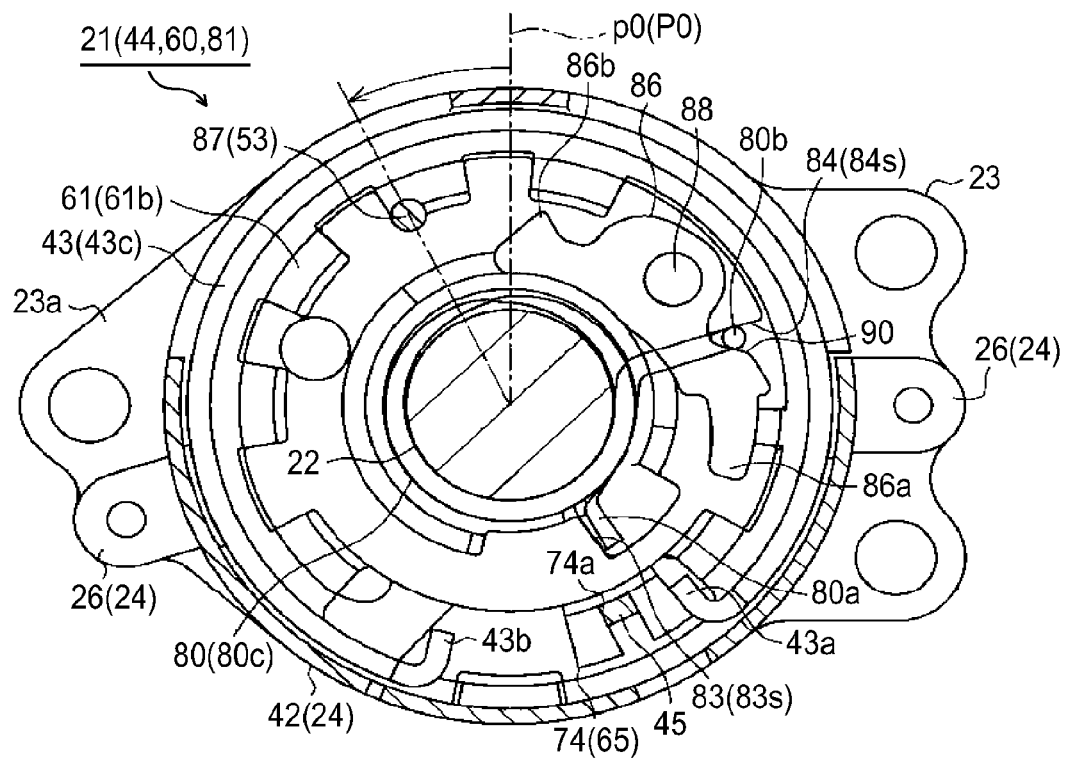
FIG. 14 is a sectional diagram of the rotational control device (the XIII-XIII cross-section in FIG. 10 during rotation in a first direction)
Figure 15:
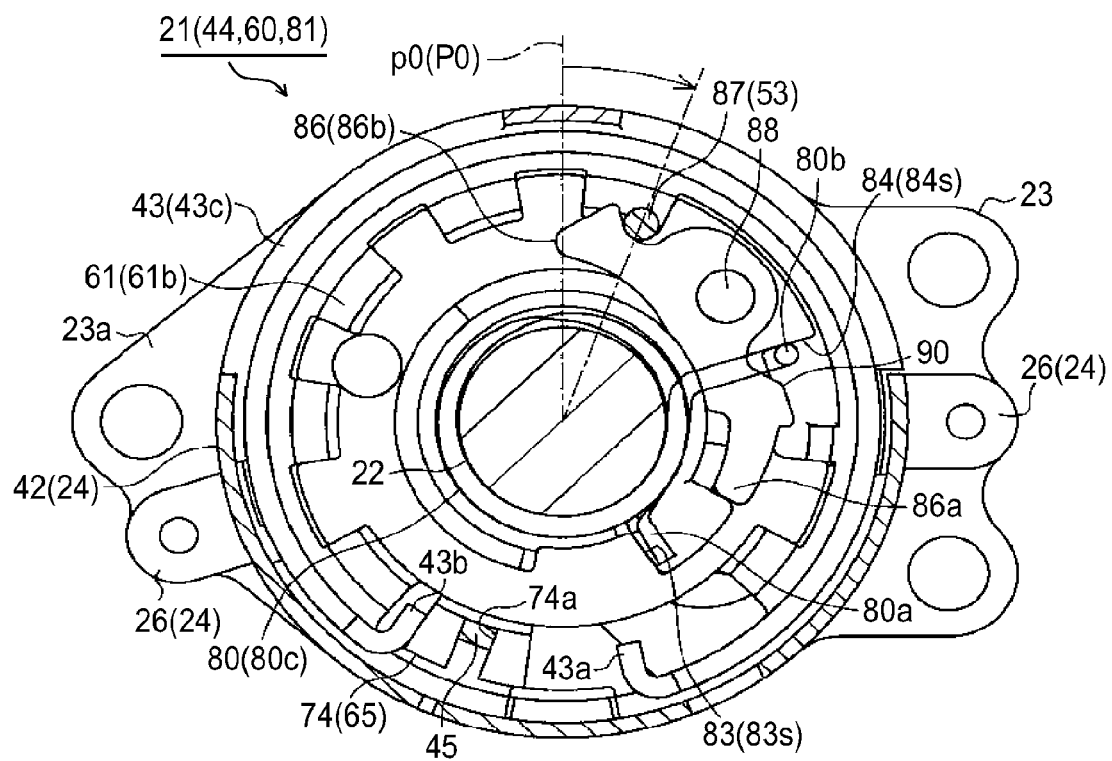
FIG. 15 is a sectional diagram of the rotational control device (the XIII-XIII cross-section in FIG. 10 during rotation in a second direction)

Specifically, as illustrated in FIG. 14, in the handle return mechanism 44 of the present embodiment, the input member 41 rotates in the first direction (the counter-clockwise direction in FIGS. 6 and 14) in accordance with a pulling up operation of the operation handle 20, and thus, the connecting part 45 which is provided on the input member 41 presses against the first folded portion 43a of the ring spring 43. As illustrated in FIG. 15, the input member 41 rotates in the second direction (the clockwise direction in FIGS. 6 and 15) in accordance with a pushing down operation of the operation handle 20, and thus, the connecting part 45 which is provided on the input member 41 presses against the second folded portion 43b of the ring spring 43.

Figure 6:
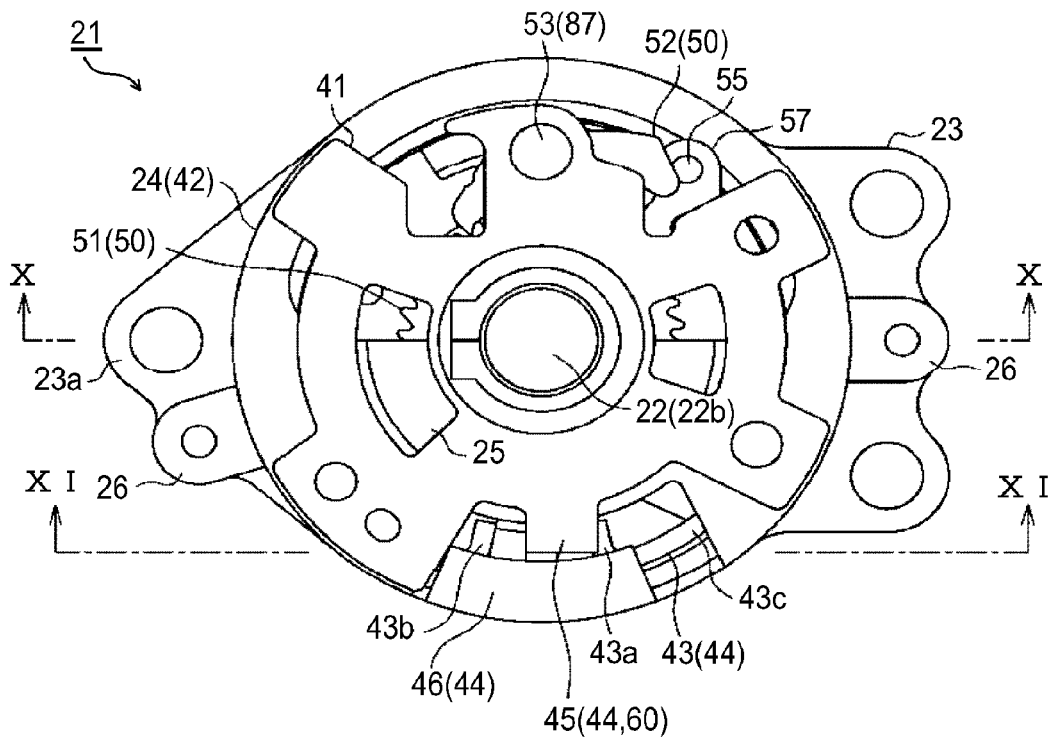
FIG. 6 is a front surface diagram of the rotational control device.

As illustrated in FIGS. 6 and 11, in the rotational control device 21 of the present embodiment, an engaging portion 46 which engages with the folded portions 43a and 43b of the ring spring 43 is formed on the second support member 24. The rotational control device 21 of the present embodiment is configured to restrict the rotation in the circumferential direction of the folded portions 43a and 43b in the opposite direction from the direction in which the connecting part 45 of the input member 41 presses against the folded portions 43a and 43b based on the engagement relationship between the folded portions 43a and 43b and the engaging portion 46.

Specifically, as illustrated in FIGS. 11 and 14, when the first folded portion 43a of the ring spring 43 which is pressed against the connecting part 45 of the input member 41 moves in the circumferential direction in the first direction (the top side in FIG. 11), the second folded portion 43b of the other side abuts against the engaging portion 46, and thus, movement in the circumferential direction in the first direction is restricted. As illustrated in FIGS. 11 and 15, when the second folded portion 43b of the ring spring 43 which is pressed against the connecting part 45 of the input member 41 moves in the circumferential direction in the second direction (the bottom side in FIG. 11), movement of the first folded portion 43a of the other side in the circumferential direction in the second direction is restricted. Accordingly, in the rotational control device 21 of the present embodiment, it becomes possible to cause the operation handle 20 which is fixed to the input member 41 to return to the neutral position P0 based on the elastic restorative force of the ring spring 43 by suppressing the co-rotation of the ring spring 43 in relation to the input member 41.

Figure 16:
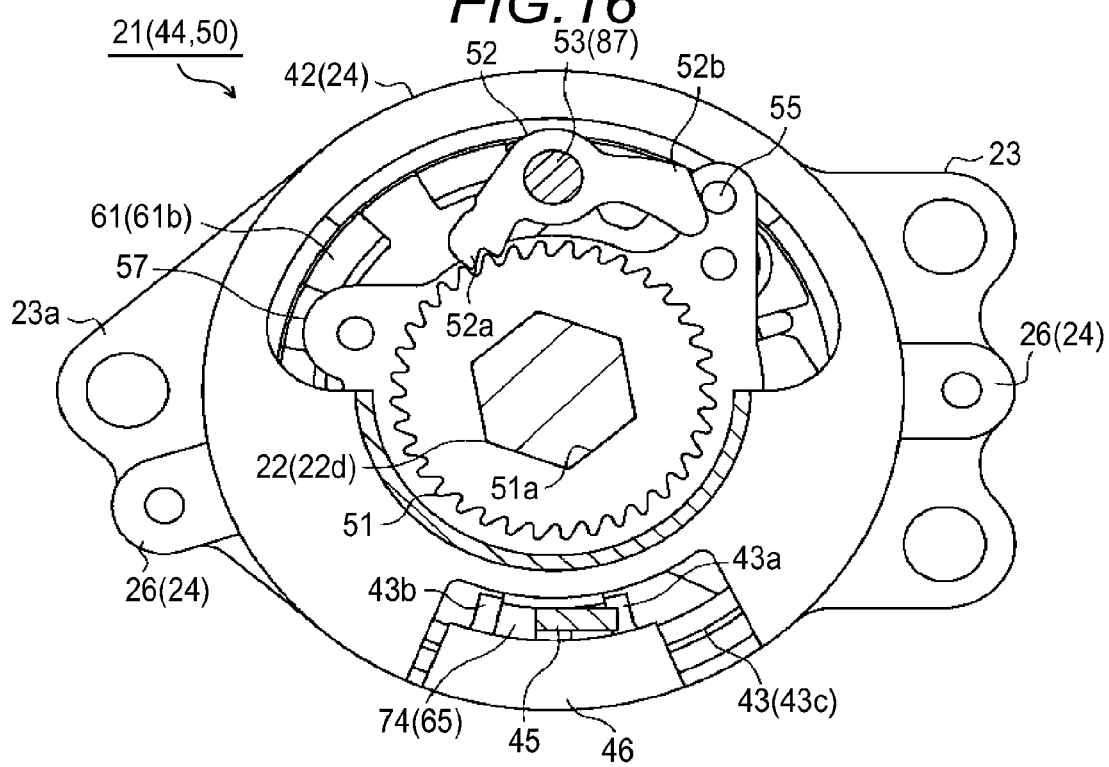
FIG. 16 is a sectional diagram of the rotational control device (a neutral position of an XVI-XVI cross-section in FIG. 10)
Figure 17:
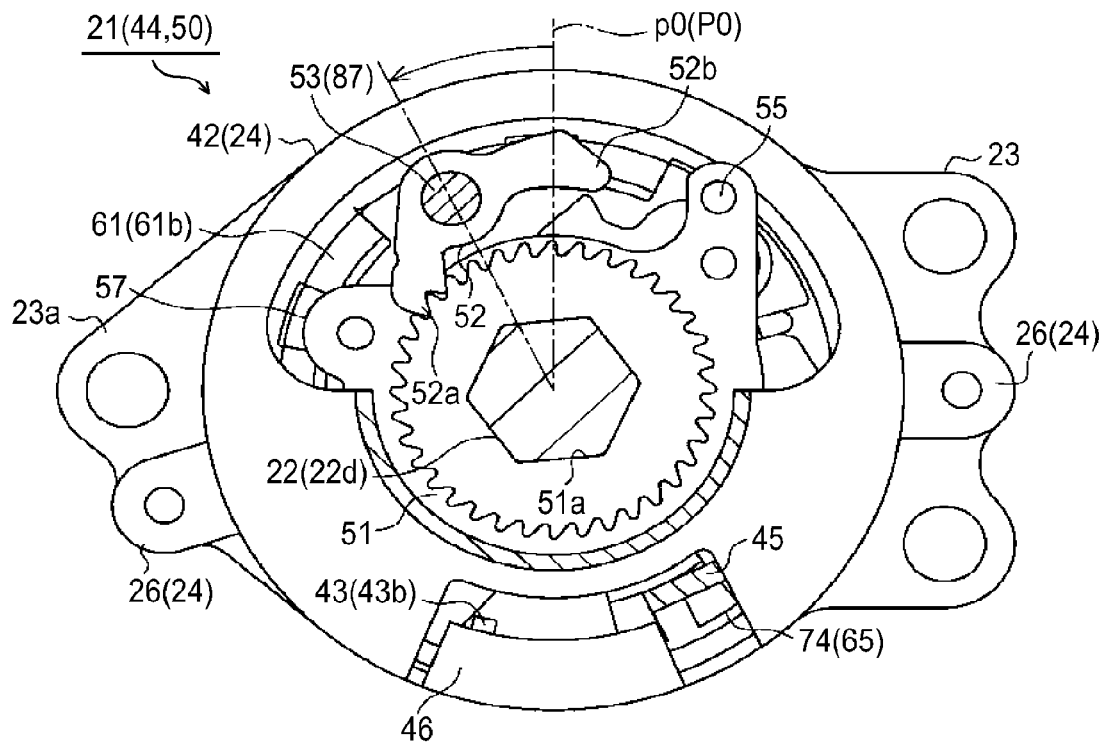
FIG. 17 is a sectional diagram of the rotational control device (the XVI-XVI cross-section in FIG. 10 during rotation in the first direction)
Figure 18:
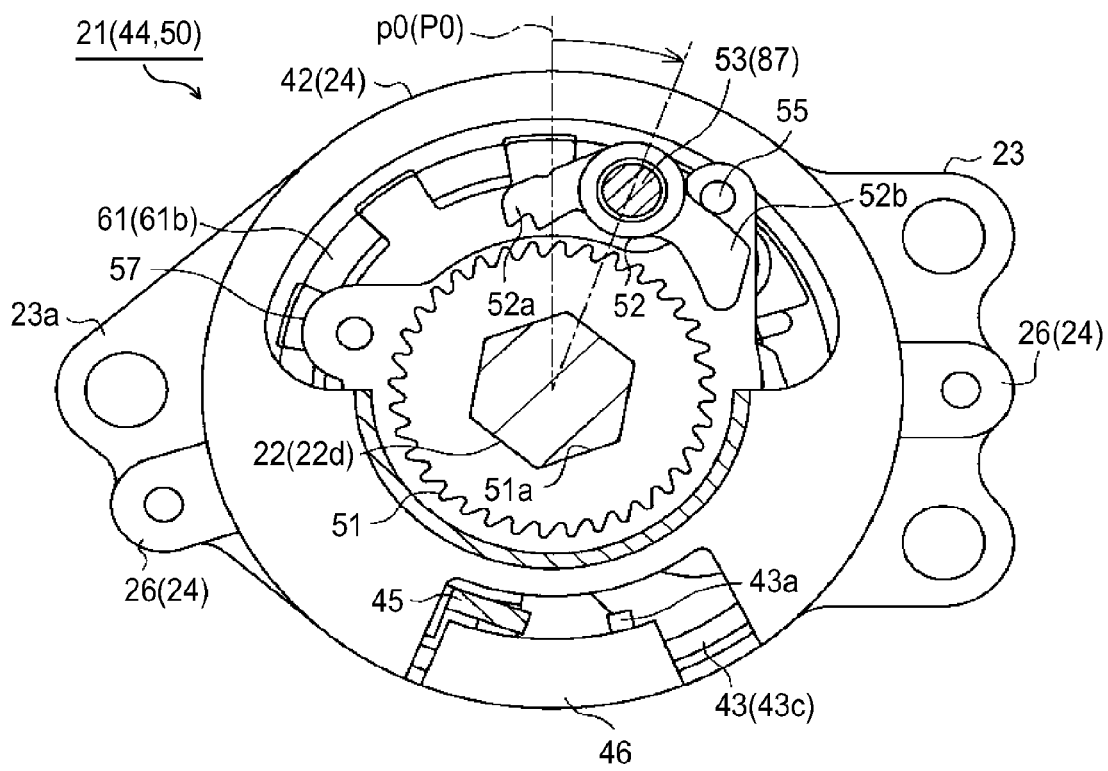
FIG. 18 is a sectional diagram of the rotational control device (the XVI-XVI cross-section in FIG. 10 during rotation in the second direction)

As illustrated in FIGS. 16 to 18, the rotational control device 21 of the present embodiment is provided with an operation input transmission mechanism 50 (a feed mechanism) which transmits a drive force which is input to the operation handle 20 to the rotating shaft 22 of the pinion gear 18 through the input member 41 rotating in the first direction (the counter-clockwise direction in FIGS. 16 to 18) in accordance with a pulling up operation of the operation handle 20.

In detail, the operation input transmission mechanism 50 of the present embodiment is provided with a ratchet 51 which rotates integrally with the rotating shaft 22 of the pinion gear 18, and a drive lever 52 which includes a meshing portion 52a, which meshes with the ratchet 51, and rotates integrally with the input member 41.

As illustrated in FIGS. 9 and 16, in the rotational control device 21 of the present embodiment, a hexagonal portion 22d which has a hexagonal cross-section is provided on the second end portion 22b side of the rotating shaft 22 of the pinion gear 18. The ratchet 51 is provided with a hexagonal hole 51a which meshes with the hexagonal portion 22d of the rotating shaft 22.

As illustrated in FIGS. 6, 8, and 16, a shaft supporter 53 which extends toward the first support member 23 side substantially parallel to the rotating shaft 22 of the pinion gear 18 is provided on the input member 41 of the present embodiment, the drive lever 52 is axially supported by the shaft supporter 53, and thus, the drive lever 52 is disposed on the outside in the radial direction of the ratchet 51 in a state of being capable of rotating. The drive lever 52 is rotationally biased around the shaft supporter 53 by an elastic force (an elastic restorative force) of a torsion coil spring 54 which is fitted into the shaft supporter 53. Accordingly, the drive lever 52 of the present embodiment is configured such that the meshing portion 52a which is provided on one end of the drive lever 52 meshes with the ratchet 51.

Furthermore, in the operation input transmission mechanism 50 of the present embodiment, the ratchet 51 and the drive lever 52 are configured such that, in a case in which the drive lever 52 which rotates integrally with the input member 41 moves the outside in the radial direction of the ratchet 51 in the circumferential direction in the first direction, the meshing between the ratchet 51 and the drive lever 52 is strengthened (bites in) based on the shapes of the meshing parts (the tooth shape). In a case in which the drive lever 52 moves the outside in the radial direction of the ratchet 51 in the circumferential direction in the second direction, based on the shapes of the meshing parts of the drive lever 52 and the ratchet 51, the meshing portion 52a of the drive lever 52 which meshes with the ratchet 51 is configured to generate a force moving to the outside in the radial direction, that is, a force which causes the meshing portion 52a to detach from the ratchet 51.

In other words, as illustrated in FIG. 17, the operation input transmission mechanism 50 of the present embodiment causes the rotating shaft 22 of the pinion gear 18 to rotate integrally with the input member 41 via the drive lever 52 which meshes with the ratchet 51 through the rotation of the input member 41 in the first direction from the neutral position p0 (P0) in accordance with a pulling up operation of the operation handle 20. When the input member 41 returns to the neutral position p0 (P0), the drive lever 52 which meshes with the ratchet 51 is configured to allow the rotation of the rotating shaft 22 in the second direction in a mode in which the drive lever 52 passes over the tooth portions of the ratchet 51, one tooth at a time.

In other words, the rotational control device 21 of the present embodiment is capable of rotationally driving the rotating shaft 22 of the pinion gear 18 in the first direction by repeating the pulling up operation of the operation handle 20 which is fixed to the input member 41. In the present embodiment, the rotational angle per pulling up operation of the operation handle 20 is set to, at maximum, an amount corresponding to two tooth portions of the ratchet 31. Accordingly, the seat lifter device 10 of the present embodiment is configured to be capable of causing the seat 1 which is supported by the link mechanism 12 to move upward.

As illustrated in FIGS. 16 and 18, the rotational control device 21 of the present embodiment is provided with an engaging member 55 which abuts against an end portion (an abutting end 52b) of the other end side of the drive lever 52 which rotates integrally with the input member 41, that is, the end portion of the opposite side from the meshing portion 52a which meshes with the ratchet 51 when the input member 41 rotates in the second direction (the clockwise direction in FIGS. 16 and 18) from the neutral position p0. The operation input transmission mechanism 50 of the present embodiment is configured such that the drive lever 52 which abuts against the engaging member 55 rotates against the biasing force of the torsion coil spring 54.

In other words, the operation input transmission mechanism 50 of the present embodiment is configured such that the meshing portion 52a of the drive lever 52 detaches from the ratchet 51 in a case in which the input member 41 rotates in the second direction from the neutral position p0. Accordingly, the rotational control device 21 of the present embodiment is configured such that the drive lever 52 does not interfere with the ratchet 51 when the operation handle 20 which is subjected to the pushing down operation returns to the neutral position P0.

As illustrated in FIGS. 9 and 10, the rotational control device 21 of the present embodiment includes a support plate 57 which includes an insertion hole 56 through which the rotating shaft 22 of the pinion gear 18 is inserted. The support plate 57 is fixed to an intermediate member 61 (described later), and thus, the rotation of the support plate 57 around the rotating shaft 22 is restricted. The engaging member 55 of the present embodiment has a shaft shape which is substantially parallel to the rotating shaft 22, and is supported by a circumferential edge portion of the support plate 57.

Figure 19:
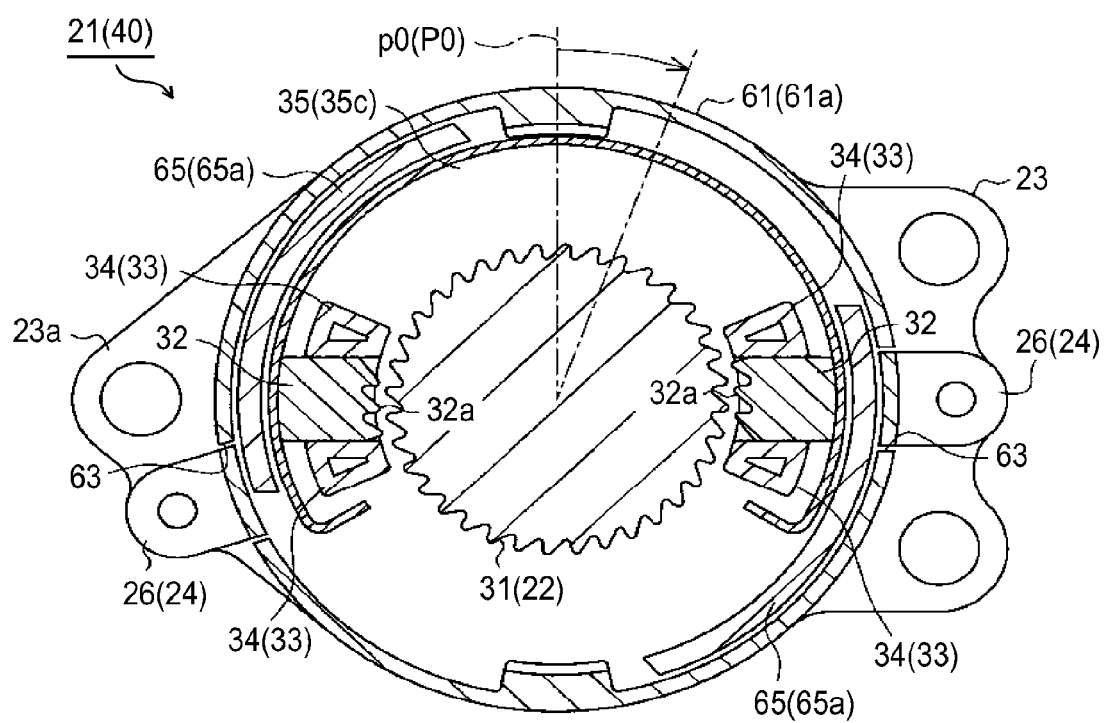
FIG. 19 is a sectional diagram of the rotational control device (the XII-XII cross-section in FIG. 10 in a state in which a ratchet mechanism is released)

As illustrated in FIG. 19, the rotational control device 21 of the present embodiment is provided with a release mechanism 60 which releases the meshing between the ratchet 31 and the lock members 32 which form the ratchet mechanism 40 through the rotation of the input member 41 in the second direction from the neutral position p0 in accordance with the pushing down operation of the operation handle 20.

In detail, as illustrated in FIG. 10, the rotational control device 21 of the present embodiment is provided with the intermediate member 61 which is interposed between the first support member 23 and the plate portion 25 of the second support member 24 in the axial line direction along the rotating shaft 22 of the pinion gear 18.

As illustrated in FIGS. 8 to 10, in the rotational control device 21 of the present embodiment, the intermediate member 61 has a flat substantially capped cylindrical exterior shape provided with a cylinder portion 61a and a cap portion 61b. The cylinder portion 61a surrounds the outside in the radial direction of the ratchet 31 which forms the ratchet mechanism 40, and the cap portion 61b is provided on one end in the axial direction of the cylinder portion 61a. The intermediate member 61 includes a circular hole 62 in the center portion of the cap portion 61b. Furthermore, a second large diameter portion 22e which has a larger diameter than the large diameter portion 22c is provided on the rotating shaft 22 of the present embodiment closer to the second end portion 22b side than the ratchet 31 (refer to FIG. 4). The inner diameter of the circular hole 62 which is provided in the cap portion 61b of the intermediate member 61 is set to be approximately equal (slightly larger than) the second large diameter portion 22e.

In other words, the intermediate member 61 of the present embodiment is disposed between the first support member 23 and the second support member 24 in a state in which the rotating shaft 22 of the pinion gear 18 is inserted through the circular hole 62 which is provided in the cap portion 61b and the other end side of the cylinder portion 61a abuts against the surface 23a of the first support member 23. As illustrated in FIGS. 8, 9, and 12, in the present embodiment, a plurality of slits 63 which extend in the axial direction are provided in the cylinder portion 61a of the intermediate member 61. The intermediate member 61 of the present embodiment is configured such that the relative rotation thereof around the rotating shaft 22 in relation to the first support member 23 and the second support member 24 is restricted through the engagement of the slits 63 with the leg portions 26 of the second support member 24.

Figure 20:
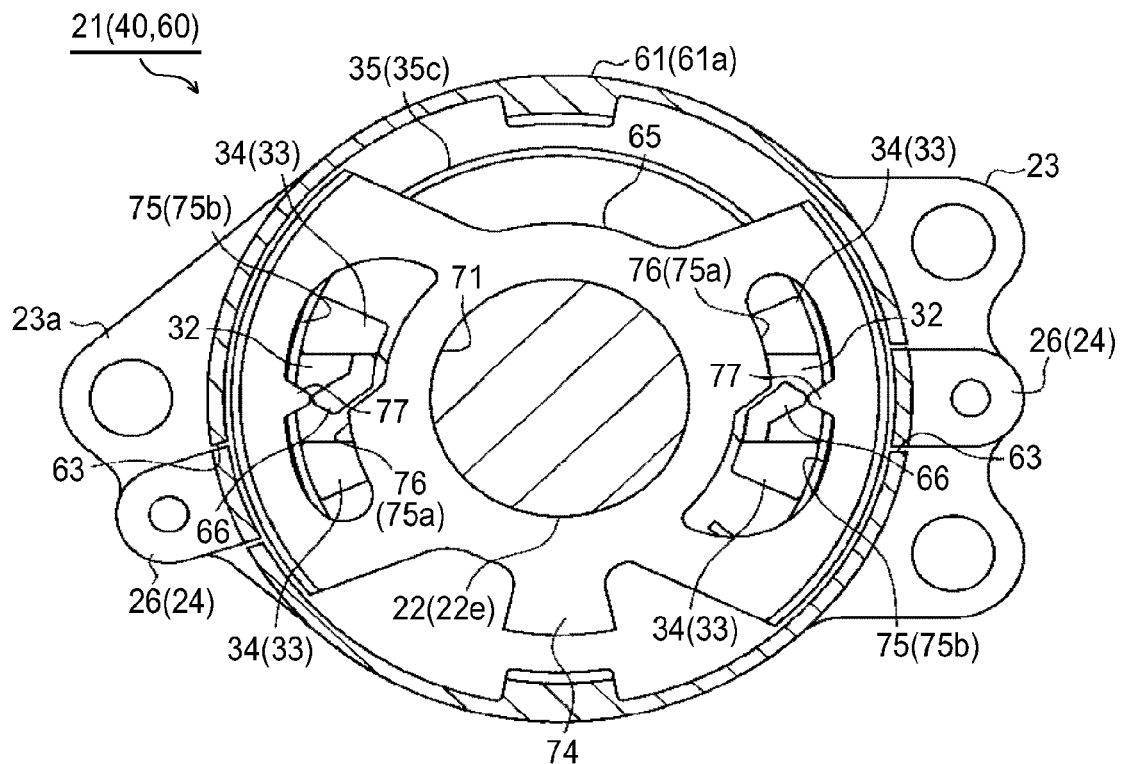
FIG. 20 is a sectional diagram of the rotational control device (a neutral position of an XX-XX cross-section in FIG. 10)

As illustrated in FIGS. 9, 10, and 20, in the rotational control device 21 of the present embodiment, the release member 65 which is linked to the input member 41 to rotate around the rotating shaft 22 of the pinion gear 18 is provided between the cap portion 61b of the intermediate member 61 and the ratchet 31. Furthermore, engaging portions 66 which engage with the release member 65 are formed in the lock members 32. The release mechanism 60 of the present embodiment is configured to release the meshing of the ratchet 31 and the lock members 32 which form the ratchet mechanism 40 based on the operation of the release member 65.

In detail, as illustrated in FIGS. 8 to 10, the release member 65 of the present embodiment has a substantially plate shaped exterior provided with, on the circumferential edge portion of the release member 65, a circumferential wall portion 65a (refer to FIG. 12) which extends along the cylinder portion 61a of the intermediate member 61. An insertion hole 71 through which the second large diameter portion 22e which is provided on the rotating shaft 22 of the pinion gear 18 is inserted is provided on the center portion of the release member 65. Furthermore, in the present embodiment, the inner diameter of the insertion hole 71 is also set to be approximately equal (slightly larger than) the second large diameter portion 22e. Accordingly, the release member 65 of the present embodiment is configured to be supported to be capable of rotating around the rotating shaft 22 of the pinion gear 18 in a state in which the circumferential wall portion 65a is facing the surface 23a side of the first support member 23.

As illustrated in FIGS. 9 and 20, the release member 65 of the present embodiment is provided with the connecting part 74 which extends from the outer circumferential edge of the release member 65 toward the outside in the radial direction. Specifically, as illustrated in FIGS. 8 and 12, in the release member 65 of the present embodiment, the circumferential wall portion 65a is provided in two positions separated in the circumferential direction. The connecting part 74 is formed in an intermediate position between the two circumferential wall portions 65a.

As illustrated in FIGS. 9, 11, and 13, a fitting recessed portion 74a is formed in the tip portion of the connecting part 74. The tip portion of the connecting part 45 which is provided on the input member 41 fits into the fitting recessed portion 74a. Accordingly, the release member 65 of the present embodiment is configured to rotate integrally with the input member 41 based on an input operation to the operation handle 20.

Meanwhile, as illustrated in FIGS. 9, 10, and 20, in the rotational control device 21 of the present embodiment, the engaging portion 66 of the lock members 32 which form the ratchet mechanism 40 has a protrusion shape which protrudes toward the release member 65 side (the left side in FIG. 10) in the axial direction. A pair of engaging holes 75 into which the engaging portions 66 of the lock members 32 are inserted are formed in the release member 65 of the present embodiment.

Specifically, each of the engaging holes 75 has a long hole shape which is long along the circumferential direction of the rotating shaft 22 which axially supports the release member 65. In the present embodiment, an inner wall surface 75a of the inside in the radial direction in each of the engaging holes 75 serves as a cam surface 76 which abuts against the engaging portion 66 of each of the lock members 32 according to the rotational position of the release member 65. In the release mechanism 60 of the present embodiment, the cam surface 76 is configured to cause the lock members 32 to detach from the ratchet 31 which is provided integrally with the rotating shaft 22 of the pinion gear 18 against the biasing force of the ring spring 35 by pressing the engaging portion 66 of the lock members 32 which are inserted into the engaging holes 75 to the outside in the radial direction according to the rotational position of the release member 65.

In further detail, as illustrated in FIG. 20, in the release member 65 of the present embodiment, a restriction protruding portion 77 which protrudes toward the inside in the radial direction is formed on each inner wall surface 75b of the outside in the radial direction in each of the engaging holes 75. As illustrated in FIGS. 20 and 6, the release mechanism 60 of the present embodiment is configured such that the tips of the restriction protruding portions 77 are disposed facing the engaging portions 66 of the lock members 32 in a case in which the input member 41 is in the neutral position p0.

In other words, in the release mechanism 60 of the present embodiment, in a case in which the input member 41 is in the neutral position p0, the restriction protruding portions 77 restrict the movement of the lock members 32 toward the outside in the radial direction, and thus, the operation of the lock members 32 detaching from the ratchet 31 is prohibited. Accordingly, the rotational control device 21 of the present embodiment is configured to hold the rotating shaft 22 of the pinion gear 18 in a state of being unable to rotate in a case in which there is no operational input to the operation handle 20.

Figure 21:
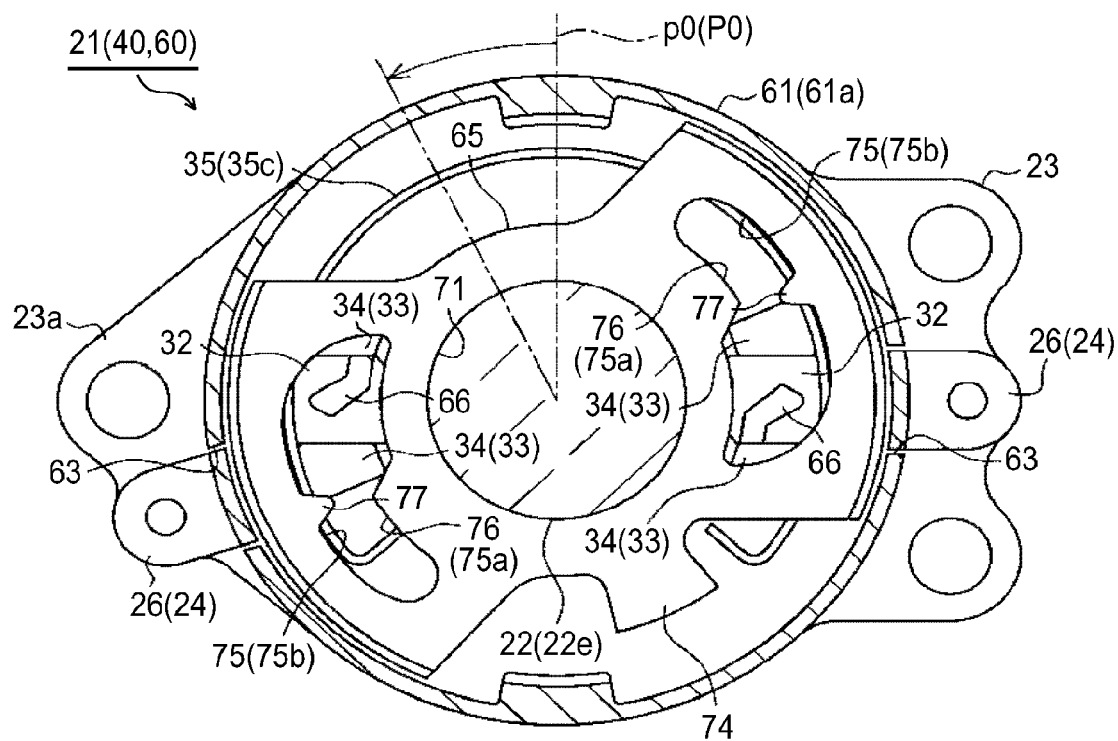
FIG. 21 is a sectional diagram of the rotational control device (the XX-XX cross-section in FIG. 10 during rotation in the first direction)

As illustrated in FIG. 21, the release mechanism 60 of the present embodiment is configured such that the cam surfaces 76 which are set in the engaging holes 75 do not abut against the engaging portions 66 of the lock members 32 in a case in which the release member 65 rotates integrally with the input member 41 in the first direction (the counter-clockwise direction in FIG. 21) from the neutral position p0. Accordingly, the release mechanism 60 is configured such that a gap is formed between the inner wall surface 75b of the outside in the radial direction of each of the engaging holes 75, and the engaging portion 66 of each of the lock members 32.

In other words, the release mechanism 60 of the present embodiment allows the movement of the lock members 32 in the radial direction during the pulling up operation of the operation handle 20. Accordingly, the rotational control device 21 of the present embodiment is capable of causing the rotating shaft 22 of the pinion gear 18 to rotate in the first direction based on the function of the ratchet mechanism 40.

Figure 22:
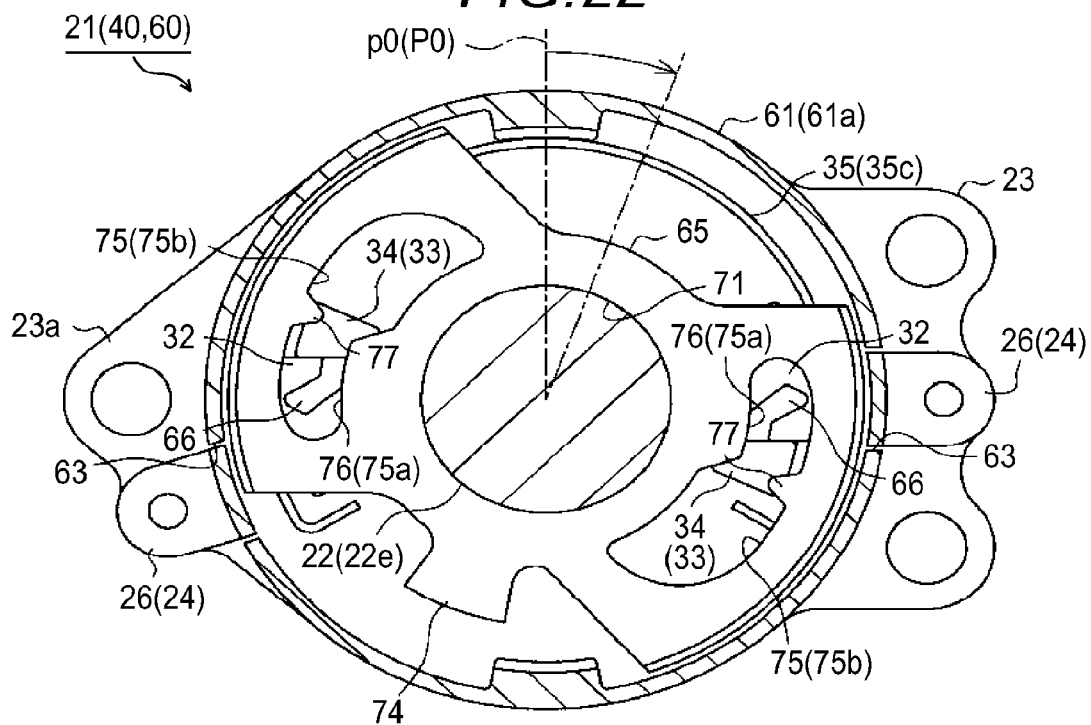
FIG. 22 is a sectional diagram of the rotational control device (the XX-XX cross-section in FIG. 10 during rotation in the second direction)

Furthermore, as illustrated in FIG. 22, the release mechanism 60 of the present embodiment is configured such that the cam surfaces 76 which are set in the engaging holes 75 abut against the engaging portions 66 of the lock members 32 to press the engaging portions 66 to the outside in the radial direction in a case in which the release member 65 rotates integrally with the input member 41 in the second direction (the clockwise direction in FIG. 22) from the neutral position p0. Accordingly, the release mechanism 60 of the present embodiment is configured to release the rotation restriction of the rotating shaft 22 caused by the meshing of the ratchet 31 and the lock members 32, that is, caused by the ratchet mechanism 40 by causing the lock members 32 to detach from the ratchet 31.

In other words, the rotational control device 21 of the present embodiment is capable of setting the rotating shaft 22 of the pinion gear 18 to a state of being capable of rotation based on the pushing down operation of the operation handle 20 which is fixed to the input member 41. Accordingly, the seat lifter device 10 of the present embodiment is capable of causing the seat 1 to move downward based on the seat load.

(Braking Mechanism)

Next, description will be given of the braking mechanism which is provided in the rotational control device 21 of the present embodiment.

As illustrated in FIGS. 8, 9, and 13, the rotational control device 21 of the present embodiment is provided with a torsion coil spring 80 which includes a coil-shaped spring main body 80c which is inserted to fit the rotating shaft 22 in a state of being in contact with the outer circumference of the rotating shaft 22 of the pinion gear 18. A braking mechanism 81 which applies a braking force to the rotating shaft 22 of the pinion gear 18 based on the friction force of the torsion coil spring 80 is formed in the rotational control device 21 of the present embodiment.

In detail, as illustrated in FIG. 10, the torsion coil spring 80 is disposed in the rotational control device 21 of the present embodiment between the cap portion 61b of the intermediate member 61 and the support plate 57 facing the cap portion 61b in the axial line direction of the rotating shaft 22. As illustrated in FIG. 13, in the cap portion 61b of the intermediate member 61, first and second engaging portions 83 and 84 which engage with first and second spring end portions 80a and 80b which are disposed on the outside in the radial direction of the rotating shaft 22 are provided through the torsion coil spring 80 being fitted onto the rotating shaft 22 of the pinion gear 18.

Specifically, the torsion coil spring 80 of the present embodiment is mounted to the rotating shaft 22 of the pinion gear 18 in a state in which the spring main body 80c is caused to warp in a diameter expanding direction by pushing and compressing the relative positions of the first and second spring end portions 80a and 80b in the circumferential direction. In the rotational control device 21 of the present embodiment, the first engaging portion 83 includes an abutting surface 83s which restricts the movement in the circumferential direction of the first spring end portion 80a in the second direction (the clockwise direction in FIG. 13). The second engaging portion 84 includes an abutting surface 84s which restricts the movement in the circumferential direction of the second spring end portion 80b in the first direction (the counter-clockwise direction in FIG. 13).

In other words, the torsion coil spring 80 of the present embodiment is configured such that the spring main body 80c which is warped in the diameter expanding direction due to the shrinkage of the gap in the circumferential direction between the first and second spring end portions 80a and 80b is in contact with the outer circumference of the rotating shaft 22 due to the diameter of the spring main body 80c shrinking based on the elastic force (the elastic restorative force) of the spring main body 80c. The braking mechanism 81 of the present embodiment is capable of setting the friction force of the spring main body 80c which is in contact with the rotating shaft 22 of the pinion gear 18, that is, the braking force applied to the rotating shaft 22 to an appropriate magnitude due to the first and second engaging portions 83 and 84 holding the interval in the circumferential direction between the first and second spring end portions 80a and 80b, which widens based on the elastic force, at a predetermined interval.

In the rotational control device 21 of the present embodiment, the first engaging portion 83 is configured to allow the movement in the circumferential direction of the first spring end portion 80a in the first direction. Furthermore, the second engaging portion 84 is configured to allow the movement in the circumferential direction of the second spring end portion 80b in the second direction. Accordingly, the rotational control device 21 of the present embodiment is configured such that the spring main body 80c of the torsion coil spring 80 warps in the diameter expanding direction due to the torsion coil spring 80 rotating in the rotational direction of the rotating shaft 22 of the pinion gear 18 and the relative positions of the first and second spring end portions 80a and 80b changing.

In other words, in a case in which the rotating shaft 22 of the pinion gear 18 rotates, the torsion coil spring 80 which is fitted in a state of being in contact with the outer circumference of the rotating shaft 22 rotates in the rotational direction of the rotating shaft 22 based on the friction force. Accordingly, the first and second spring end portions 80a and 80b are also apt to move in the circumferential direction in the rotational direction of the torsion coil spring 80.

At this time, using the first and second engaging portions 83 and 84, the braking mechanism 81 of the present embodiment is configured so as to allow the movement in the circumferential direction toward the rotational direction of the torsion coil spring 80 for one of the first and second spring end portions 80a and 80b, and to restrict the movement in the circumferential direction for the other. Accordingly, the braking mechanism 81 is configured such that the gap in the circumferential direction between the first and second spring end portions 80a and 80b shrinks, the spring main body 80c warps in the diameter expanding direction, and thus, the friction force of the spring main body 80c which is in contact with the rotating shaft 22 of the pinion gear 18, that is, the braking force applied to the rotating shaft 22 weakens.

For example, as illustrated in FIG. 14, the rotating shaft 22 rotates in the first direction (the counter-clockwise direction in FIG. 14) due to the drive force which is input through the input of the pulling up operation of the operation handle 20 being transmitted to the rotating shaft 22 of the pinion gear 18 via the operation input transmission mechanism 50. Accordingly, the torsion coil spring 80 which is fitted in a state of being in contact with the outer circumference of the rotating shaft 22 rotates in the first direction based on the friction force between the torsion coil spring 80 and the rotating shaft 22.

At this time, using the second engaging portion 84, the braking mechanism 81 of the present embodiment restricts movement in the circumferential direction of the second spring end portion 80b in the first direction, whereas the braking mechanism 81 allows movement in the circumferential direction in the first direction for the first spring end portion 80a which is positioned closer to the rear side in the rotational direction (the second direction side) than the second spring end portion 80b. In other words, the spring main body 80c of the torsion coil spring 80 warps in the diameter expanding direction due to the first spring end portion 80a which moves in the circumferential direction in the first direction approaching the second spring end portion 80b which is restricted from moving in the circumferential direction. Accordingly, in the rotational control device 21 of the present embodiment, due to the braking force which is applied to the rotating shaft 22 of the pinion gear 18 weakening, it is possible to perform the pulling up operation of the operation handle 20 which causes the seat 1 which is supported by the link mechanism 12 to move upward smoothly.

Figure 23:
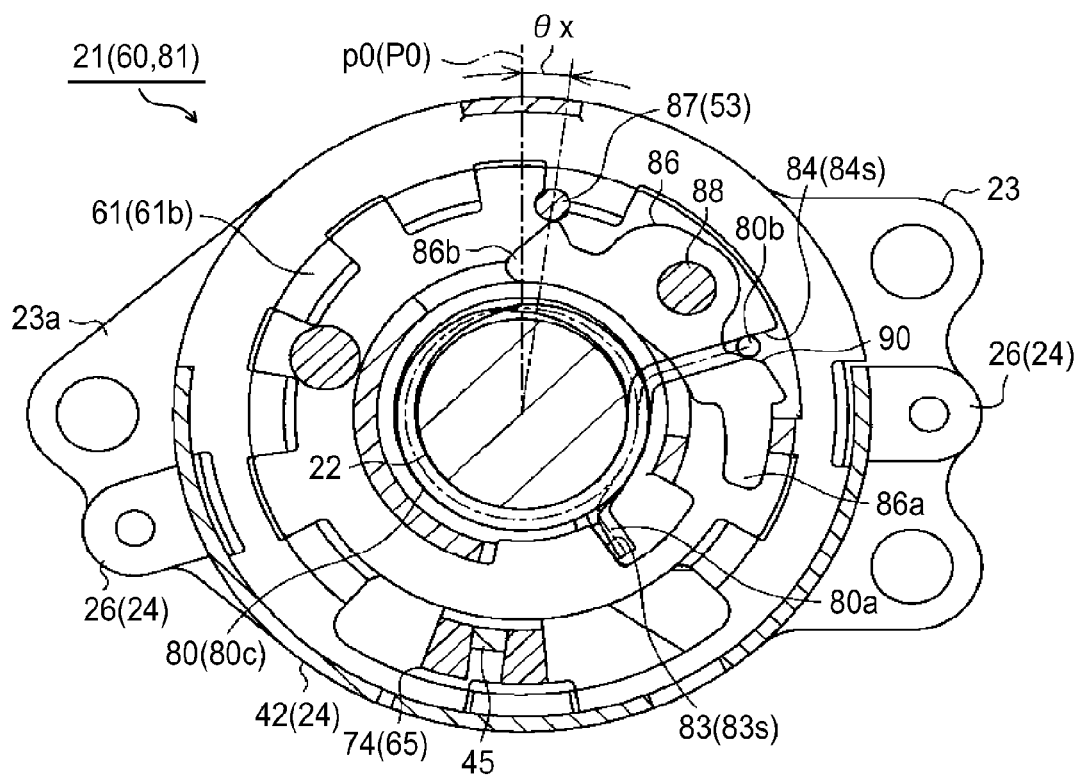
FIG. 23 is a sectional diagram of the rotational control device (a lock member detachment angle of an XIII-XIII cross-section in FIG. 10)

Here, as illustrated in FIGS. 13 and 23, the braking mechanism 81 of the present embodiment is provided with a holding lever 86 which abuts against the second spring end portion 80b in a case in which the torsion coil spring 80 rotates in the second direction based on the friction force between the torsion coil spring 80 and the rotating shaft 22 of the pinion gear 18 which rotates in the second direction (the clockwise direction in FIGS. 13 and 23). The braking mechanism 81 is provided with a stopper 87 which moves to a position in the circumferential direction at which the stopper 87 abuts against the holding lever 86 by rotating integrally with the input member 41 which rotates in the second direction in accordance with the pushing down operation of the operation handle 20. The braking mechanism 81 of the present embodiment is configured to restrict the relative positional variation of the first and second spring end portions 80a and 80b in the circumferential direction when the meshing of the ratchet 31 and the lock members 32 which form the ratchet mechanism 40 is released based on the operation of the release mechanism 60 based on the operation of the holding lever 86 and the stopper 87.

In detail, the holding lever 86 of the present embodiment is axially supported to be capable of rotating around a support shaft 88 which is provided on the cap portion 61b of the intermediate member 61. In the present embodiment, the support shaft 88 is provided to stand in a state of being substantially parallel to the rotating shaft 22 at a position closer to the first direction side (the counter-clockwise direction in FIGS. 13 and 23) than the second engaging portion 84 in the vicinity of the second engaging portion 84. A first end 86a side of the holding lever 86 of the present embodiment passes the second engaging portion 84 and extends to the first direction side. In the present embodiment, the holding lever 86 is rotationally biased in the counter-clockwise direction in the drawings based on the elastic force of a torsion coil spring (not illustrated) which is fitted to the support shaft 88. Accordingly, in the holding lever 86 of the present embodiment, a base end portion of the first end 86a which is disposed to face the abutting surface 84s which forms the second engaging portion 84 serves as an abutting portion 90 which abuts against the second spring end portion 80b.

As illustrated in FIGS. 8, 9, 23, and 24, in the braking mechanism 81 of the present embodiment, the shaft supporter 53 of the drive lever 52 which forms the operation input transmission mechanism 50, specifically, the one end side extending toward the first support member 23 side is configured to also serve as the stopper 87. As illustrated in FIG. 23, the stopper 87 is configured to restrict the rotation of the holding lever 86 in the clockwise direction in the drawings by rotating integrally with the input member 41 in the second direction to move to a position in the circumferential direction at which the stopper 87 abuts against a second end 86b of the holding lever 86.

Figure 24:
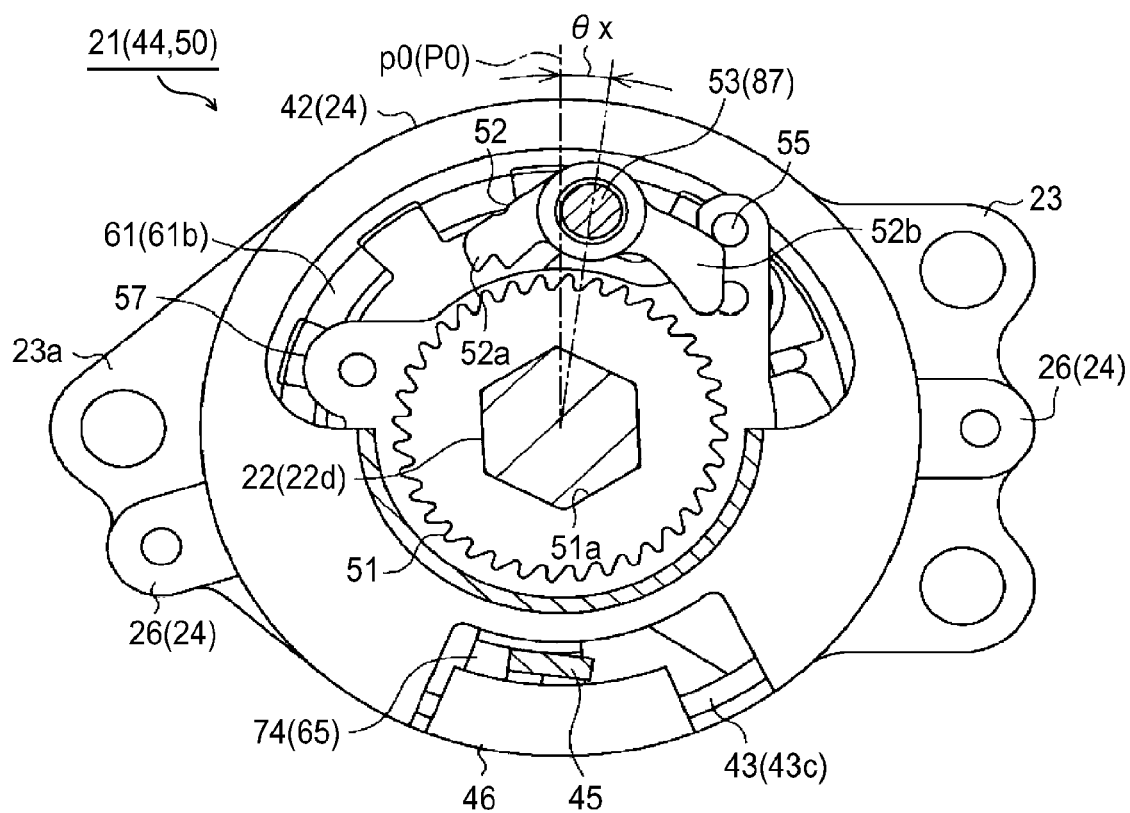
FIG. 24 is a sectional diagram of the rotational control device (a lock member detachment angle of the XVI-XVI cross-section in FIG. 10).

In further detail, as illustrated in FIGS. 23 and 24, the rotational control device 21 of the present embodiment is configured such that the lock members 32 detach from the ratchet 31 based on the operation of the release mechanism 60 at a predetermined rotational angle θx to which the input member 41 is rotated in the second direction from the neutral position p0 in accordance with the pushing down operation of the operation handle 20.

In the braking mechanism 81 of the present embodiment, the stopper 87 is configured to enter a state of being capable of abutting against the second end 86b of the holding lever 86 in a case in which the input member 41 is positioned within a predetermined range in the circumferential direction which reaches the rotational angle θx through the stopper 87 moving in the circumferential direction in the second direction in accordance with the rotation of the input member 41. The holding lever 86 is configured to restrict the movement in the circumferential direction of the second spring end portion 80b in the second direction using the first end 86a on which the abutting portion 90 is provided in a state in which the rotation of the holding lever 86 around the support shaft 88 in the clockwise direction in the drawings is restricted by the stopper 87.

In other words, as described above, the release mechanism 60 of the present embodiment gradually reduces the meshing amount of the ratchet 31 and the lock members 32 by causing the lock members 32 to move to the outside in the radial direction of the ratchet 31. Accordingly, the release mechanism 60 is configured to finally cause the lock members 32 to detach from the ratchet 31.

The braking mechanism 81 of the present embodiment is configured such that the stopper 87 abuts against the holding lever 86 to restrict the rotation of the holding lever 86 during a period from a point in time at which the meshing amount of the ratchet 31 and the lock members 32 which form the ratchet mechanism 40 starts to be reduced based on the operation of the release mechanism 60 until the lock members 32 are detached from the ratchet 31. Accordingly, the braking mechanism 81 is configured such that, when the meshing of the ratchet 31 and the lock members 32 is released based on the operation of the release mechanism 60 through the holding lever 86 restricting the movement in the circumferential direction of the second spring end portion 80b in the second direction, the relative positional variation of the first and second spring end portions 80a and 80b in which the spring main body 80c of the torsion coil spring 80 warps in the diameter expanding direction is restricted.

As illustrated in FIG. 15, the stopper 87 of the present embodiment is configured to move to a position in the circumferential direction which allows the rotation of the holding lever 86 through the input member 41 rotating in excess of the rotational angle θx at which the lock members 32 detach from the ratchet 31. Accordingly, the holding lever 86 of the present embodiment is configured to allow movement in the circumferential direction of the second spring end portion 80b in the second direction through being pressed into the second spring end portion 80b which moves in the circumferential direction in the second direction to rotate around the support shaft 88.

In other words, when the meshing of the ratchet 31 and the lock members 32 is released based on the operation of the release mechanism 60, the meshing amount of the ratchet 31 and the lock members 32 is reduced, and thus, the rotating shaft 22 of the pinion gear 18 is apt to rotate in the second direction based on the load of the seat 1 which is supported by the link mechanism 12. Accordingly, the torsion coil spring 80 which is fitted in a state of being in contact with the outer circumference of the rotating shaft 22 rotates in the second direction based on the friction force between the torsion coil spring 80 and the rotating shaft 22.

At this time, in the braking mechanism 81 of the present embodiment, the movement in the circumferential direction of the second spring end portion 80b which abuts against the holding lever 86 is restricted through the stopper 87 which rotates integrally with the input member 41 in the second direction restricting the rotation of the holding lever 86 (refer to FIG. 23).

In other words, when the meshing of the ratchet 31 and the lock members 32 is released based on the operation of the release mechanism 60, the braking mechanism 81 of the present embodiment restricts the relative positional variation of the first and second spring end portions 80a and 80b, maintains the inner diameter of the spring main body 80c which is in contact with the rotating shaft 22, and thus, applies a braking force based on the friction force to the rotating shaft 22 without weakening the braking force. Accordingly, when releasing the rotational restriction of the ratchet mechanism 40 through the pushing down operation of the operation handle 20, the rotational control device 21 of the present embodiment is configured such that a great load from the side of the pinion gear 18 which meshes with the input gear 16 of the link mechanism 12 is not applied to the ratchet 31 and the lock members 32 which form the first and second meshing members.

Subsequently, the braking mechanism 81 of the present embodiment is configured such that the second spring end portion 80b moves in the circumferential direction in the second direction in a mode in which the holding lever 86 is pushed around through the input member 41 rotating in the second direction in excess of the rotational angle θx at which the lock members 32 detach from the ratchet 31, and the rotational restriction of the holding lever 86 by the stopper 87 being released (refer to FIG. 15).

In other words, the spring main body 80c of the torsion coil spring 80 warps in the diameter expanding direction due to the second spring end portion 80b approaching the first spring end portion 80a which is restricted from moving in the circumferential direction in the second direction by the first engaging portion 83. Accordingly, in the rotational control device 21 of the present embodiment, due to the braking force which is applied to the rotating shaft 22 of the pinion gear 18 weakening, it is possible to cause the seat 1 which is supported by the link mechanism 12 to move downward (and to move upward) smoothly.

In the braking mechanism 81 of the present embodiment, the movement in the circumferential direction in the second direction of the second spring end portion 80b is allowed during a period until the stopper 87 which rotates integrally with the input member 41 in the second direction in accordance with the pushing down operation of the operation handle 20 moves to a position in the circumferential direction at which the stopper 87 abuts against the second end 86b of the holding lever 86.

In other words, in a case in which the operation handle 20 is in the vicinity of the neutral position P0, the braking mechanism 81 of the present embodiment is configured such that the relative positions of the first and second spring end portions 80a and 80b change and the spring main body 80c of the torsion coil spring 80 warps in the diameter expanding direction due to the torsion coil spring 80 rotating in the rotational direction of the rotating shaft 22 of the pinion gear 18 regardless of the rotational direction. Accordingly, the rotational control device 21 of the present embodiment is configured such that the rotating shaft 22 of the pinion gear 18 is capable of rotating to a position at which the ratchet 31 and the lock members 32 which form the ratchet mechanism 40 mesh correctly after the operation of the operation handle.

According to the present embodiment described above, it is possible to obtain the following effects.

(1) The rotational control device 21 of the seat lifter device 10 is provided with the input member 41 which is linked to the operation handle 20 to rotate around the rotating shaft 22 of the pinion gear 18, and the release mechanism 60 which releases the meshing of the ratchet 31 and the lock members 32 which form the ratchet mechanism 40 through the rotation of the input member 41 from the neutral position p0. The rotational control device 21 is further provided with the braking mechanism 81 which applies a braking force to the rotating shaft 22. The braking mechanism 81 is provided with the torsion coil spring 80 which serves as a spring member in which the spring main body 80c is fitted to the rotating shaft 22 in a state of being in contact with the outer circumference of the rotating shaft 22 based on the elastic force, and the first and second spring end portions 80a and 80b are disposed on the outside in the radial direction of the rotating shaft 22. The braking mechanism 81 is configured such that the torsion coil spring 80 rotates in the rotational direction of the rotating shaft 22, and thus, the relative positions of the first and second spring end portions 80a and 80b change, and the spring main body 80c warps in the diameter expanding direction. The braking mechanism 81 is configured such that, when the meshing of the ratchet 31 and the lock members 32 is released based on the operation of the release mechanism 60, variation in the relative positions of the first and second spring end portions 80*a* and 80*b* in which the spring main body 80*c* of the torsion coil spring 80 warps in the diameter expanding direction is restricted.

In other words, it is possible to apply the braking force to the rotating shaft 22 based on the friction force through the fitting of the torsion coil spring 80 onto the rotating shaft 22 of the pinion gear 18 in a state in which the spring main body 80*c* contacts the rotating shaft 22 based on the elastic force. The torsion coil spring 80 rotates in the rotational direction of the rotating shaft 22 based on the friction force between the torsion coil spring 80 and the rotating shaft 22. According to this configuration, when causing the rotating shaft 22 of the pinion gear 18 to rotate based on the operational input to the operation handle 20, it is possible to perform operational input to the operation handle 20 smoothly due to the torsion coil spring 80 warping in the diameter expanding direction and the braking force which is applied to the torsion coil spring 80 weakening. It is possible to cause the rotating shaft 22 of the pinion gear 18 to rotate to a position at which the ratchet 31 and the lock members 32 which form the ratchet mechanism 40 mesh correctly after the operation of the operation handle.

When the meshing of the ratchet 31 and the lock members 32 is released based on the operation of the release mechanism 60, variation in the relative positions of the first and second spring end portions 80*a* and 80*b* in which the spring main body 80*c* warps in the diameter expanding direction is restricted, and thus, it is possible to apply the braking force, which is based on the friction force of the torsion coil spring 80, to the rotating shaft 22 of the pinion gear 18 without weakening the braking force. Accordingly, it is possible to ensure that a great load from the side of the pinion gear 18 which meshes with the input gear 16 of the link mechanism 12 is not applied to the ratchet 31 and the lock members 32 when the meshing is released. As a result, it is possible to reduce the operational force which is necessary for the release operation of the ratchet mechanism 40 to improve usability. Additionally, it is possible to suppress the generation of a release sound to secure a high degree of silence. Accordingly, it is possible to realize operational comfort which is superior to that of the related art.

Furthermore, according to this configuration, it is possible to suppress variation in the friction force which is generated through a variation in the friction state caused by the rotating shaft 22 of the pinion gear 18 rotating, that is, through a transition from a static friction state to a dynamic friction state. Accordingly, by applying a stable braking force to the rotating shaft 22, it is possible to ensure that the seat 1 does not suddenly move downward due to the seat load during the release operation of the rotational restriction of the ratchet mechanism 40.

(2) The release mechanism 60 releases the meshing between the ratchet 31 and the lock members 32 which form the ratchet mechanism 40 through the rotation of the input member 41 in the second direction from the neutral position p0 in accordance with the pushing down operation of the operation handle 20. The braking mechanism 81 is provided with the first engaging portion 83 which restricts movement in the circumferential direction of the first spring end portion 80*a* in a case in which the torsion coil spring 80 rotates in the second direction, and the holding lever 86 which is axially supported to be capable of rotating around the support shaft 88 and abuts against the second spring end portion 80*b* in a case in which the torsion coil spring 80 rotates in the second direction. Furthermore, the braking mechanism 81 is provided with the stopper 87 which restricts the rotation of the holding lever 86 when the meshing of the ratchet 31 and the lock members 32 is released based on the operation of the release mechanism 60 through the stopper 87 rotating integrally with the input member 41 in the second direction to move to a position in the circumferential direction at which the stopper 87 abuts against the holding lever 86. The holding lever 86 is configured to restrict the movement in the circumferential direction of the second spring end portion 80*b* in a case in which the holding lever 86 is in a state in which the rotation around the support shaft 88 is restricted, and to allow movement in the circumferential direction of the second spring end portion 80*b* through the holding lever 86 being pressed into the second spring end portion 80*b* to rotate in a case in which the rotation around the support shaft 88 is allowed. The stopper 87 is configured to move to a position in the circumferential direction which allows the rotation of the holding lever 86 through the input member 41 rotating in the second direction in excess of the rotational angle θx at which the lock members 32 detach from the ratchet 31.

According to this configuration, in a case in which the input member 41 rotates in the second direction from the neutral position p0, only when the meshing of the ratchet 31 and the lock members 32 is released based on the operation of the release mechanism 60, it is possible to restrict the variation in the relative positions of the first and second spring end portions 80*a* and 80*b* in which the spring main body 80*c* of the torsion coil spring 80 warps in the diameter expanding direction. Besides when the meshing is released, it is possible to cause the relative positions of the first and second spring end portions 80*a* and 80*b* to change such that the spring main body 80*c* of the torsion coil spring 80 warps in the diameter expanding direction due to the second spring end portion 80*b* approaching the first spring end portion 80*a* which is restricted from moving in the circumferential direction in the second direction. Accordingly, it is possible to smoothly release the rotational restriction of the ratchet mechanism 40 through the pushing down operation of the operation handle 20.

(3) The braking mechanism 81 is provided with the operation input transmission mechanism 50 which transmits a drive force which is input to the operation handle 20 to the rotating shaft 22 of the pinion gear 18 through the input member 41 rotating in the first direction from the neutral position p0 in accordance with the pulling up operation of the operation handle 20. The braking mechanism 81 is provided with the second engaging portion 84 which restricts movement in the circumferential direction of the second spring end portion 80*b* in a case in which the torsion coil spring 80 rotates in the first direction. The first engaging portion 83 is configured to allow the movement in the circumferential direction of the first spring end portion 80*a* in a case in which the torsion coil spring 80 rotates in the first direction.

According to this configuration, it is possible to cause the seat 1 which is supported by the link mechanism 12 to move upward based on the function of the ratchet mechanism 40 which allows the rotation of the rotating shaft 22 of the pinion gear 18 in the first direction in which the seat 1 moves upward and restricts the rotation of the rotating shaft 22 in the second direction in which the seat 1 moves downward, and based on the function of the operation input transmission mechanism 50. At this time, the relative positions of the first and second spring end portions 80*a* and 80*b* change such that the spring main body 80*c* warps in the diameter expanding direction due to the torsion coil spring 80 rotating in the first direction based on the friction force between the rotating shaft 22 of the pinion gear 18 and the torsion coil spring 80, and the first spring end portion 80*a* approaching the second spring end portion 80*b* which is restricted from moving in the circumferential direction in the first direction. Accordingly, it is possible to perform the pulling up operation of the operation handle 20 which causes the seat 1 to move upward smoothly.

(4) The operation input transmission mechanism 50 is provided with the ratchet 51 which rotates integrally with the rotating shaft 22 of the pinion gear 18, and the drive lever 52 which includes the meshing portion 52*a*, which meshes with the ratchet 51, and rotates integrally with the input member 41. The drive lever 52 is configured such that the meshing portion 52*a* meshes with the ratchet 51 to transmit the drive force to the ratchet 51 in a case in which the input member 41 rotates in the first direction due to the drive lever 52 being rotationally biased based on the elastic force of the torsion coil spring 54 which is fitted to the shaft supporter 53. Furthermore, the drive lever 52 is configured such that the meshing portion 52*a* detaches from the ratchet 51 due to the drive lever 52 rotating against the biasing force of the torsion coil spring 54 in a case in which the input member 41 rotates in the second direction. The braking mechanism 81 is configured such that the shaft supporter 53 of the drive lever 52 functions as the stopper 87.

According to this configuration, it is possible to cause the seat 1 to move upward by repeating the pulling up operation of the operation handle 20. It is possible to achieve a simplification in configuration by causing the shaft supporter 53 of the drive lever 52 to also serve as the stopper 87.

The embodiment described above may be modified in the following manners.

In the embodiment described above, the input gear 16 (the sector gear) which uses the joining point X2 with the side frame 13 of the seat 1 as the rotational center is provided on the rear link 11*b* of the link mechanism 12. However, the configuration of the input gear 16 is not limited thereto, and may be modified arbitrarily. For example, the input gear 16 may be provided on the front link 11*a*, and is not necessarily a sector gear. The rotational center which the input gear 16 shares with the link member 11 may be the joining point (X1 or X2) with the side frame 13 which serves as a seat-side joining member, and may be the joining point (X3 or X4) with the base member 14 which serves as a floor-side joining member.

In the embodiment described above, the link members 11 form a well-known parallel link mechanism. However, the configuration is not limited thereto, and as long as it is possible to cause the seat 1 to undergo lifting and lowering operations based on the rotation of the pinion gear 18 which meshes with the input gear 16, the type of the link mechanism 12 may be modified arbitrarily, including the number of the link members 11.

In the embodiment described above, the operation handle 20 is directly fixed to the input member 41. The input member 41 rotates integrally with the operation handle 20 through the rotational operation of the operation handle 20. However, the configuration is not limited thereto, and, for example, a configuration may be adopted in which the operation handle 20 is joined to the input member 41 via a gear or the like. The operation handle 20 and the input member 41 may not necessarily be disposed on the same axis.

Furthermore, in the embodiment described above, a configuration is adopted in which the seat 1 moves upward through the pulling up operation of the operation handle 20, and the rotational restriction of the ratchet mechanism 40 is released through the pushing down operation. However, the configuration is not limited thereto, and a configuration may be adopted in which the rotational restriction of the ratchet mechanism 40 is released through the pulling up operation of the operation handle 20, and the seat 1 moves upward through the pushing down operation.

In the embodiment described above, the release mechanism 60 releases the meshing of the ratchet 31 and the lock members 32 which serve as the first and second meshing members which form the ratchet mechanism 40 which serves as the rotation restriction mechanism through the rotation of the input member 41 in the second direction. The braking mechanism 81 is provided with the holding lever 86 which abuts against the second spring end portion 80*b* in a case in which the torsion coil spring 80 rotates in the second direction, and the stopper 87 which restricts the rotation of the holding lever 86 when the meshing of the ratchet 31 and the lock members 32 is released based on the operation of the release mechanism 60.

However, the configuration is not limited thereto, and a release mechanism is provided which releases the meshing of the first and second meshing members which form the rotation restriction mechanism even in a case in which the input member 41 rotates in the first direction. The braking mechanism may be configured to be provided with a holding lever which abuts against the first spring end portion 80*a* in a case in which the torsion coil spring 80 rotates in the first direction, and a stopper which restricts the rotation of the holding lever when the meshing of the first and second meshing members is released based on the operation of the release mechanism. Accordingly, it is possible to apply to a configuration in which the ratchet mechanism 40 is not used in the rotation restriction mechanism.

In the embodiment described above, the torsion coil spring 80 which has the coil-shaped spring main body 80*s* is used as the spring member of the braking mechanism 81. In the torsion coil spring 80, the spring main body 80*c* warps in the diameter expanding direction due to the interval in the circumferential direction between the first and second spring end portions 80*a* and 80*b*. However, the configuration is not limited thereto, and a configuration may be adopted in which a torsion coil spring is used in which the spring main body 80*c* warps in the diameter expanding direction through the widening of the interval in the circumferential direction between the first and second spring end portions 80*a* and 80*b*. In this case, the abutting surfaces 83*s* and 84*s* in the first and second engaging portions 83 and 84, and (the abutting portion 90 of) the holding lever 86 face the opposite direction from in the embodiment described above. As long as the spring main body is fitted to the rotating shaft 22 in a state of being in contact with the outer circumference of the rotating shaft 22 based on the elastic force, and the relative positions of the first and second spring end portions which are disposed on the outside in the radial direction of the rotating shaft 22 vary such that the spring main body warps in the diameter expanding direction, a configuration may be adopted in which another spring member such as a spring member with a C-ring shaped spring main body or the like is used.

The rotating shaft 22 may not necessarily be formed integrally with the pinion gear 18. Furthermore, for example, the rotating shaft, such as one which is joined via a gear, may not necessarily be disposed on the same axis as the pinion gear. The configuration of the operation input transmission mechanism, the release mechanism which releases the meshing of the first and second meshing members, or the like may also be modified arbitrarily.

It is preferable that a vehicle seat lifter device according to an aspect of this disclosure includes a pinion gear which meshes with an input gear of a link mechanism which causes a seat to undergo lifting and lowering operations, and a rotational control device which controls rotation of the pinion gear, in which the rotational control device includes a rotating shaft which rotates in synchronization with the pinion gear, a rotation restriction mechanism including a first meshing member which rotates with the rotating shaft and a second meshing member which restricts rotation of the rotating shaft by meshing with the first meshing member, an input member which is linked to an operation handle to rotate around the rotating shaft, a release mechanism which releases the meshing of the first and second meshing members through rotation of the input member from a neutral position, and a braking mechanism which applies a braking force to the rotating shaft, in which the braking mechanism is provided with a spring member in which a spring main body is fitted to the rotating shaft in a state of being in contact with an outer circumference of the rotating shaft based on an elastic force, and first and second spring end portions are disposed on an outside in a radial direction of the rotating shaft, where relative positions of the first and second spring end portions change and the spring main body warps in a diameter expanding direction due to the spring member rotating in a rotational direction of the rotating shaft, and in which the braking mechanism is configured such that, when the meshing of the first and second meshing members is released based on an operation of the release mechanism, relative positional variation of the first and second spring end portions which causes the spring main body to warp in the diameter expanding direction is restricted.

Thus, it is possible to apply the braking force to the rotating shaft based on the friction force through the fitting of the spring member to the rotating shaft in a state in which the spring main body contacts the rotating shaft based on the elastic force. The spring member rotates in the rotational direction of the rotating shaft based on the friction force between the spring member and the rotating shaft. Therefore, according to the configuration described above, when causing the rotating shaft to rotate based on the operational input to the operation handle, it is possible to perform operational input to the operation handle smoothly due to the spring member warping in the diameter expanding direction and the braking force which is applied to the spring member weakening. It is possible to cause the rotating shaft to rotate to a position at which the first and second meshing members which form the rotation restriction mechanism mesh correctly after the operation of the operation handle.

When the meshing of the first and second meshing members is released based on the operation of the release mechanism, variation in the relative positions of the first and second spring end portions in which the spring main body warps in the diameter expanding direction is restricted, and thus, it is possible to apply the braking force, which is based on the friction force of the spring member, to the rotating shaft without weakening the braking force. Accordingly, it is possible to ensure that a great load from the side of the pinion gear which meshes with the input gear of the link mechanism is not applied to the first and second meshing members when the meshing is released. As a result, it is possible to reduce the operational force which is necessary for the release operation of the rotation restriction mechanism to improve usability. Additionally, it is possible to suppress the generation of a release sound to secure a high degree of silence. Accordingly, it is possible to realize operational comfort which is superior to that of the related art.

Furthermore, according to the configuration described above, it is possible to suppress variation in the friction force which is generated through a variation in the friction state caused by the rotation of the rotating shaft, that is, through a transition from a static friction state to a dynamic friction state. Accordingly, by applying a stable braking force to the rotating shaft, it is possible to ensure that the seat does not suddenly move downward due to the seat load during the release operation of the rotational restriction mechanism.

In the vehicle seat lifter device according to the aspect of this disclosure, it is preferable that the braking mechanism includes a first engaging portion which restricts movement in a circumferential direction of the first spring end portion in a case in which the spring member rotates in a rotational direction of the rotating shaft, a holding lever which is axially supported to be capable of rotating around a support shaft and abuts against the second spring end portion in a case in which the spring member rotates in the rotational direction of the rotating shaft, and a stopper which restricts rotation of the holding lever when the meshing of the first and second meshing members is released based on an operation of the release mechanism through the stopper rotating integrally with the input member to move to a position in the circumferential direction at which the stopper abuts against the holding lever, the holding lever is configured to restrict the movement in the circumferential direction of the second spring end portion in a case in which the holding lever is in a state in which the rotation around the support shaft is restricted, and to allow movement in the circumferential direction of the second spring end portion through the holding lever being pressed into the second spring end portion to rotate in a case in which the rotation around the support shaft is allowed, and the stopper is configured to move to a position in the circumferential direction which allows the rotation of the holding lever through the input member rotating in excess of a rotational angle at which the second meshing member detaches from the first meshing member.

According to this configuration, only when the meshing of the first and second meshing members is released based on the operation of the release mechanism, it is possible to restrict variation in the relative positions of the first and second spring end portions in which the spring main body of the spring member warps in the diameter expanding direction. Besides when the meshing is released, it is possible to cause the relative positions of the first and second spring end portions to change such that the spring main body warps in the diameter expanding direction due to the second spring end portion, which moves in the circumferential direction in the rotational direction of the rotating shaft, approaching the first spring end portion which is restricted from moving in the circumferential direction. Accordingly, it is possible to smoothly operate the operation handle in order to release the rotational restriction of the rotation restriction mechanism.

It is preferable that the vehicle seat lifter device according to the aspect of this disclosure further includes an operation input transmission mechanism which transmits a drive force which is input to the operation handle to the rotating shaft through the input member rotating in the first direction from the neutral position, that the rotation restriction mechanism is a ratchet mechanism which restricts the rotation of the rotating shaft in a second direction in which the seat moves downward while allowing the rotation of the rotating shaft in a first direction in which the seat moves upward, that the release mechanism releases rotation restriction of the rotating shaft caused by the ratchet mechanism through the input member rotating in the second direction from the neutral position, and that the braking mechanism includes the first engaging portion which restricts movement in the circumferential direction of the first spring end portion in a case in which the spring member rotates in the second direction and allows movement in the circumferential direction of the first spring end portion in a case in which the spring member rotates in the first direction, the holding lever which abuts against the second spring end portion in a case in which the spring member rotates in the second direction, and a second engaging portion which restricts movement in the circumferential direction of the second spring end portion in a case in which the spring member rotates in the first direction.

According to this configuration, it is possible to release the rotational restriction of the rotating shaft to cause the seat to move downward by performing operational input on the operation handle which causes the input member to rotate in the second direction. It is possible to cause the seat which is supported by the link mechanism to move upward based on the function of the ratchet mechanism which forms the rotation restriction mechanism and the function of the operation input transmission mechanism by performing operational input on the operation handle, causing the input member to rotate in the first direction. Furthermore, at this time, the relative positions of the first and second spring end portions change such that the spring main body warps in the diameter expanding direction due to the spring member rotating in the first direction based on the friction force between the rotating shaft and the spring member, and the first spring end portion approaching the second spring end portion which is restricted from moving in the circumferential direction in the first direction. Accordingly, it is possible to operate the operation handle in order to cause the seat to move upward smoothly.

In the vehicle seat lifter device according to the aspect of this disclosure, it is preferable that the operation input transmission mechanism includes a ratchet which rotates integrally with the rotating shaft, and a drive lever which includes a meshing portion, which meshes with the ratchet, and rotates integrally with the input member, that the drive lever is configured such that the meshing portion meshes with the ratchet to transmit a drive force to the ratchet in a case in which the input member rotates in the first direction due to the drive lever being rotationally biased around a shaft supporter based on a biasing force of a biasing member, and is configured such that the meshing portion detaches from the ratchet due to the drive lever rotating around the shaft supporter against the biasing force in a case in which the input member rotates in the second direction, and that the braking mechanism is configured such that the shaft supporter of the drive lever functions as the stopper.

According to this configuration, it is possible to cause the seat to move upward by repeating an operation on the operation handle which causes the input member to rotate in the first direction and which causes the input member to return to the neutral position. It is possible to achieve a simplification in configuration by causing the shaft supporter of the drive lever to also serve as the stopper.

In the vehicle seat lifter device according to the aspect of this disclosure, it is preferable that the spring member is a torsion coil spring.

According to this configuration, it is possible to cause the spring main body to warp in the diameter expanding direction by changing the relative positions of the first and second spring end portions. By including a coil-shaped spring main body, it is possible to easily set an appropriate warping amount.

According to the aspect of this disclosure, it is possible to realize operational comfort which is superior to that of the related art.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle seat lifter device comprising:
   a pinion gear which meshes with an input gear of a link mechanism which causes a seat to undergo lifting and lowering operations; and
   a rotational control device which controls rotation of the pinion gear,
   wherein the rotational control device includes
      a rotating shaft which rotates in synchronization with the pinion gear,
      a rotation restriction mechanism including a first meshing member which rotates with the rotating shaft and a second meshing member which restricts rotation of the rotating shaft by meshing with the first meshing member,
      an input member which is linked to an operation handle to rotate around the rotating shaft,
      a release mechanism which releases the meshing of the first and second meshing members through rotation of the input member from a neutral position, and
      a braking mechanism which applies a braking force to the rotating shaft, wherein the braking mechanism is provided with a spring member in which a spring main body is fitted to the rotating shaft in a state of being in contact with an outer circumference of the rotating shaft based on an elastic force, and first and second spring end portions are disposed on an outside in a radial direction of the rotating shaft, where relative positions of the first and second spring end portions change and the spring main body warps in a diameter expanding direction due to the spring member rotating in a rotational direction of the rotating shaft,
   wherein the braking mechanism is configured such that, when the meshing of the first and second meshing members is released based on an operation of the release mechanism, relative positional variation of the first and second spring end portions which causes the spring main body to warp in the diameter expanding direction is restricted,
   wherein the braking mechanism includes
      a first engaging portion which restricts movement in a circumferential direction of the first spring end portion in a case in which the spring member rotates in a rotational direction of the rotating shaft,
      a holding lever which is axially supported to be capable of rotating around a support shaft and abuts against the second spring end portion in a case in which the spring member rotates in the rotational direction of the rotating shaft, and a stopper which restricts rotation of the holding lever when the meshing of the first and second meshing members is released based on an operation of the release mechanism through the stopper rotating integrally with the input member to move to a position in the circumferential direction at which the stopper abuts against the holding lever, wherein the holding lever is configured to restrict the movement in the circumferential direction of the second spring end portion in a case in which the holding lever is in a state in which the rotation around the support shaft is restricted, and to allow movement in the circumferential direction of the second spring end portion through the holding lever being pressed into the second spring end portion to rotate in a case in which the rotation around the support shaft is allowed, and wherein the stopper is configured to move to a position in the circumferential direction which allows the rotation of the holding lever through the input member rotating in excess of a rotational angle at which the second meshing member detaches from the first meshing member.

2. The vehicle seat lifter device according to claim 1, further comprising:

an operation input transmission mechanism which transmits a drive force which is input to the operation handle to the rotating shaft through the input member rotating in the first direction from the neutral position, wherein the rotation restriction mechanism is a ratchet mechanism which restricts the rotation of the rotating shaft in a second direction in which the seat moves downward while allowing the rotation of the rotating shaft in a first direction in which the seat moves upward, wherein the release mechanism releases rotation restriction of the rotating shaft caused by the ratchet mechanism through the input member rotating in the second direction from the neutral position, and wherein the braking mechanism includes the first engaging portion which restricts movement in the circumferential direction of the first spring end portion in a case in which the spring member rotates in the second direction and allows movement in the circumferential direction of the first spring end portion in a case in which the spring member rotates in the first direction, the holding lever which abuts against the second spring end portion in a case in which the spring member rotates in the second direction, and a second engaging portion which restricts movement in the circumferential direction of the second spring end portion in a case in which the spring member rotates in the first direction.

3. The vehicle seat lifter device according to claim 2, wherein the operation input transmission mechanism includes a ratchet which rotates integrally with the rotating shaft, and a drive lever which includes a meshing portion, which meshes with the ratchet, and rotates integrally with the input member, wherein the drive lever is configured such that the meshing portion meshes with the ratchet to transmit a drive force to the ratchet in a case in which the input member rotates in the first direction due to the drive lever being rotationally biased around a shaft supporter based on a biasing force of a biasing member, and is configured such that the meshing portion detaches from the ratchet due to the drive lever rotating around the shaft supporter against the biasing force in a case in which the input member rotates in the second direction, and wherein the braking mechanism is configured such that the shaft supporter of the drive lever functions as the stopper.

4. The vehicle seat lifter device according to claim 1, wherein the spring member is a torsion coil spring.

* * * * *